US011572375B2

(12) United States Patent
Klosin et al.

(10) Patent No.: US 11,572,375 B2
(45) Date of Patent: Feb. 7, 2023

(54) CATALYST SYSTEMS COMPRISING CARBORANE COCATALYSTS

(71) Applicants: DOW GLOBAL TECHNOLOGIES, LLC, Midland, MI (US); THE TEXAS A&M UNIVERSITY SYSTEM, College Station, TX (US)

(72) Inventors: Jerzy Klosin, Midland, MI (US); Rafael Huacuja, Lake Jackson, TX (US); Oleg V. Ozerov, College Station, TX (US); Jessica De Mott, Yardley, PA (US)

(73) Assignees: DOW GLOBAL TECHNOLOGIES, LLC, Midland, MI (US); THE TEXAS A&M UNIVERSITY SYSTEM, College Station, TX (US)

( * ) Notice: Subject to any disclaimer, the term of this patent is extended or adjusted under 35 U.S.C. 154(b) by 0 days.

(21) Appl. No.: 16/760,713

(22) PCT Filed: Oct. 31, 2018

(86) PCT No.: PCT/US2018/058390
§ 371 (c)(1),
(2) Date: Apr. 30, 2020

(87) PCT Pub. No.: WO2019/089715
PCT Pub. Date: May 9, 2019

(65) Prior Publication Data

US 2020/0331933 A1 Oct. 22, 2020

Related U.S. Application Data

(60) Provisional application No. 62/579,413, filed on Oct. 31, 2017.

(51) Int. Cl.
*C08F 4/52* (2006.01)
*C08F 4/64* (2006.01)
(Continued)

(52) U.S. Cl.
CPC .................. *C07F 5/05* (2013.01); *C08F 4/52* (2013.01); *C08F 210/16* (2013.01); *C08F 4/64193* (2013.01); *C08F 4/6592* (2013.01); *C08F 4/65908* (2013.01); *C08F 4/76* (2013.01); *C08F 2420/02* (2013.01)

(58) Field of Classification Search
CPC .... C08F 4/52; C08F 4/64193; C08F 4/65908; C08F 4/6592
See application file for complete search history.

(56) References Cited

U.S. PATENT DOCUMENTS 5,153,157 A * 10/1992 Hlatky .................... C07F 17/00 502/103
5,278,119 A 1/1994 Turner et al.
(Continued)

FOREIGN PATENT DOCUMENTS

| | | |
|---|---|---|
| JP | 2001-518883 | 10/2001 |
| WO | 1998/043983 | 10/1998 |
| WO | 2014/071401 | 5/2014 |

OTHER PUBLICATIONS

Stoebenau, E.J.; Jordan, R.F. J. Organomet. Chem. 2006, 691, 4956-4962. (Year: 2006).*
(Continued)

*Primary Examiner* — Rip A Lee
(74) *Attorney, Agent, or Firm* — McDonnell Boehnen Hulbert & Berghoff LLP

(57) ABSTRACT

Disclosed are catalyst systems comprising the reaction product of at least the following:

A) a procatalyst; and

B) at least one cocatalyst structure selected from the following i) through iii):

i) at least one cocatalyst comprising an anion having Structure 1 as shown below:

(Structure 1)

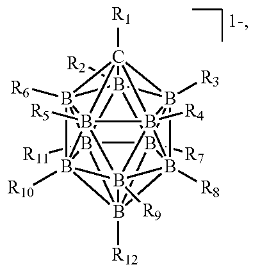

as described herein; or ii) at least one cocatalyst comprising an anion having Structure 2 as shown below:

(Structure 2)

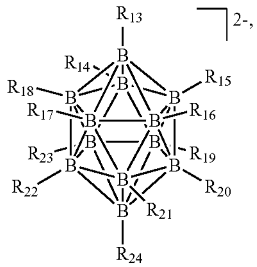

as described herein; or iii) a combination of i and ii.

19 Claims, No Drawings

(51) Int. Cl.

| | |
|---|---|
| ***C08F 4/76*** | (2006.01) |
| ***C07F 5/05*** | (2006.01) |
| ***C08F 210/16*** | (2006.01) |
| *C08F 4/659* | (2006.01) |
| *C08F 4/6592* | (2006.01) |

(56) References Cited

U.S. PATENT DOCUMENTS

| | | | | |
|---|---|---|---|---|
| 5,387,660 | A | 2/1995 | Doyle et al. | |
| 5,731,470 | A | 3/1998 | Michl et al. | |
| 6,335,466 | B1 | 1/2002 | Strauss et al. | |
| 6,448,447 | B1 * | 9/2002 | Strauss | B01J 27/08<br>568/3 |
| 7,087,687 | B2 * | 8/2006 | Goodall | C08F 210/00<br>526/117 |
| 7,161,040 | B2 | 1/2007 | Franken et al. | |

OTHER PUBLICATIONS

The International Search Report (ISR) with Written Opinion for PCT/US2018/058390 dated Feb. 13, 20199, pp. 1-16.

Stoebenau, Edward J. et al. "Synthesis, structure and properties of the Cp2Zr{CH(SiMe3)2}<+> cation" Journal of Organometallic Chemistry (2006) vol. 691, pp. 4956-4962.

Office Action for Japanese Patent Applicatio No. 2020-52331 dated Oct. 25, 3033, pp. 1-5.

* cited by examiner

CATALYST SYSTEMS COMPRISING CARBORANE COCATALYSTS

CROSS-REFERENCE TO RELATED APPLICATIONS

This application is a U.S. national phase of International Application No. PCT/US2018/058390, filed Oct. 31, 2018, which claims the benefit of priority to U.S. Provisional Application No. 62/579,413, filed Oct. 31, 2017, the disclosure of each of which is incorporated herein in its entirety.

BACKGROUND

To be catalytically active, olefin polymerization procatalysts need to be activated with an appropriate cocatalyst. A cocatalyst has a tremendous effect on catalyst performance. Conventional cocatalysts are based on MAO and ammonium tetrakis(pentafluorophenyl)-borate compounds. The weakly coordinating nature of tetrakis(pentafluoro-phenyl)borate anion is the main reason for its usefulness in olefin-based polymerizations. Other ionic polymerization catalyst systems, comprising of bulky anions, derived from polynuclear boranes, carboranes or metallacarboranes, are described in U.S. Pat. No. 6,245,706.

However, there remains a need for new "weakly coordinating" catalyst systems that can efficiently polymerize olefin-based polymers at high polymerization temperatures (for example, T>170° C.). This need has been met by the following invention.

SUMMARY OF THE INVENTION

A catalyst system is provided, which comprises the reaction product of at least the following: A) a procatalyst; and B) at least one cocatalyst structure selected from the following i) through iii):

i) at least one cocatalyst comprising an anion selected from Structure 1 as shown below:

(Structure 1)

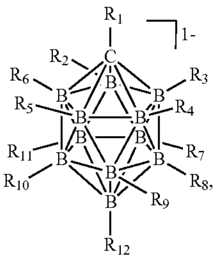

wherein $R_1$ through $R_{12}$ are each independently selected from the following: a halogen, a substituted or unsubstituted $(C_1\text{-}C_{40})$hydrocarbyl, or a substituted or unsubstituted $(C_1\text{-}C_{40})$heterohydrocarbyl, $Si(R^c)_3$, $Si(N(R^c)_2)_3$, $Si(O(R^c)_2)_3$, $Ge(R^c)_3$, $Ge(N(R^c)_2)_3$, $Ge(O(R^c)_2)_3$, $P(R^c)_2$, $P(N(R^c)_2)_2$, $P(OR)_2$, $N(R^c)_2$, $NH(R^c)$, $NH_2$, OH, SH, $OR^c$, $SR^c$, $NO_2$, CN, $CF_3$, $CF_2R^c$, $CF(R^c)_2$, $R^cS(O)$—, $R^cS(O)_2$—, $(R^c)_2C{=}N$—, $R^cC(O)O$—, $R^cOC(O)$—, $R^cC(O)N(R^c)$—, $(R^c)_2NC(O)$—, or hydrogen, wherein each $R^c$ is independently a substituted or unsubstituted $(C_1\text{-}C_{35})$hydrocarbyl, or a substituted or unsubstituted $(C_1\text{-}C_{35})$heterohydrocarbyl; and wherein two or more of $R_1$ through $R_{12}$ may optionally form one or more ring structures; and wherein one or more hydrogen atoms may optionally be substituted with deuterium; and wherein, optionally, one of $R_1$ through $R_{12}$ may be selected from a $PH(R^c)_2$, $PH(N(R^c)_2)_2$, $PH(OR^c)$, $NH(R^c)_2$, $NH(R^c)_2$, $NH_3$, $OH_2$, $SH_2$, $OHR^c$, $SHR^c$, to form a neutral structure: and wherein each $R^r$ is independently a substituted or unsubstituted $(C_1\text{-}C_{35})$hydrocarbyl, or a substituted or unsubstituted $(C_1\text{-}C_{35})$heterohydrocarbyl; and wherein at least one of $R_1$ through $R_{12}$ is a halogen: or ii) at least one cocatalyst comprising an anion selected from Structure 2 as shown below:

(Structure 2)

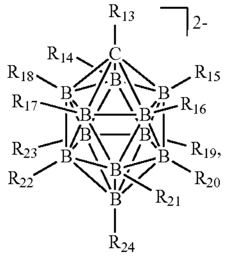

wherein $R_{13}$ through $R_{24}$ are each independently selected from the following: a halogen, a substituted or unsubstituted $(C_1\text{-}C_{40})$hydrocarbyl, or a substituted or unsubstituted $(C_1\text{-}C_{40})$heterohydrocarbyl, $Si(R^c)_3$, $Si(N(R^c)_2)_3$, $Si(O(R^c)_2)_3$, $Ge(R^c)_3$, $Ge(N(R^c)_2)_3$, $Ge(O(R^c)_2)_3$, $P(R^c)_2$, $P(N(R^c)_2)_2$, $P(OR)_2$, $N(R^c)_2$, $NH(R^c)$, $NH_2$, OH, SH, $OR^c$, $SR^c$, $NO_2$, CN, $CF_3$, $CF_2R^c$, $CF(R^c)_2$, $R^cS(O)$—, $R^cS(O)_2$—, $(R^c)_2C{=}N$—, $R^cC(O)O$—, $R^cOC(O)$—, $R^cC(O)N(R^c)$—, $(R^c)_2NC(O)$—, or hydrogen, and wherein each $R^c$ is independently a substituted or unsubstituted $(C_1\text{-}C_{35})$hydrocarbyl, or a substituted or unsubstituted $(C_1\text{-}C_{35})$heterohydrocarbyl; and wherein two or more of $R_{13}$ through $R_{24}$ may optionally form one or more ring structures: and wherein one or more hydrogen atoms may optionally be replaced with deuterium; and wherein, optionally, one of $R_{13}$ through $R_{24}$ may be selected from a $PH(R^c)_2$, $PH(N(R^c)_2)_2$, $PH(OR^c)$, $NH(R^c)_2$, $NH(R^c)_2$, $NH_3$, $OH_2$, $SH_2$, $OHR^c$, $SHR^c$, to form a neutral structure; and wherein each $R^c$ is independently a substituted or unsubstituted $(C_1\text{-}C_{35})$hydrocarbyl, or a substituted or unsubstituted $(C_1\text{-}C_{35})$heterohydrocarbyl: and wherein at least one of $R_{13}$ through $R_{24}$ is a halogen; or iii) a combination of i and ii.

DETAILED DESCRIPTION OF THE INVENTION

It has been discovered that halogenated carboranes can be used to effectively catalyze the polymerization of olefins at high temperatures.

As discussed above, a catalyst system is provided, which comprises the reaction product of: A) a procatalyst; and B) at least one cocatalyst structure selected from the following i) through iii), each as discussed above.

The catalyst system may comprise a combination of two or more embodiments as described herein.

In one embodiment, Embodiment A hereinafter, the cocatalyst structures Structure 1 and Structure 2 further comprise at least one cation selected from the following: $[Y_nX\text{-}L_m]^+$, wherein X is selected from B, C, N, O, Al, Si, P, or S; each Y is independently selected from a $(C_1\text{-}C_{40})$-hydrocarbyl, $(C_1\text{-}C_{40})$heterohydrocarbyl, $Si(R^c)_3$, $Ge(R^c)_3$, $P(R^c)_2$, $N(R^c)_2$, $OR^c$, $SR^c$, $NO_2$, CN, $CF_3$, $R^cS(O)$—, $R^cS(O)_2$—, $(R^c)_2C{=}N$—, $R^cC(O)O$—, $R^cOC(O)$—, $R^cC(O)N$ $(R^c)$—, $(R^c)_2NC(O)$—, halogen atom, or a hydrogen atom, wherein each of the hydrocarbyl, heterohydrocarbyl, $Si(R^c)_3$, $Ge(R^c)_3$, $P(R^c)_2$, $N(R^c)_2$, $OR^c$, $SR^c$, $R^cS(O)$—, $R^cS(O)_2$—, $(R^c)_2C{=}N$—, $R^cC(O)O$—, $R^cOC(O)$—, $R^cC(O)N(R^c)$—, $(R^c)_2NC(O)$—, is unsubstituted or substituted with one or more $R^s$ substituents, each $R^J$ independently is a halogen atom, polyfluoro substitution, perfluoro substitution, unsubstituted $(C_1\text{-}C_{18})$alkyl, $F_3C$—, $FCH_2O$—, $F_2HCO$—, $F_3CO$—, $R_3Si$—, $R_3Ge$—, RO—, RS—, RS(O)—, $RS(O)_2$—, $R_2P$—, $R_2N$—, $R_2C{=}N$—, NC—, RC(O)O—, ROC(O)—, $RC(O)N(R^c)$—, or $R_2NC(O)$—, or two of the Y groups together with X form a hetero$(C_1\text{-}C_{18})$hydrocarbylene (i.e., a heteroaryl or heterocycloalkyl group) optionally substituted with one or more $R^s$ substituents, and wherein each $R^c$ is $(C_1\text{-}C_{40})$hydrocarbyl, and R independently is an unsubstituted $(C_1\text{-}C_{13})$hydrocarbyl; m is independently 0, 1, 2 or 3; L is a neutral Lewis base, and when m=0, L is not present: n is independently 2, 3, 4 or 5:

or where two or three $[Y_nX]^+$ can optionally be linked together by joining two or more $(C_1\text{-}C_{35})$hydrocarbyl, $(C_1\text{-}C_{35})$heterohydrocarbyl or an RC.

In certain embodiments of Embodiment A, cation $[Y_nX\text{-}L_m]^+$ is selected from the following:

(a)

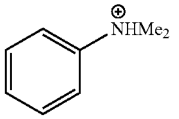

(b)

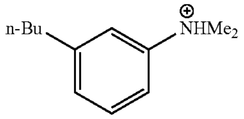

(c)

⊕
$N(H)(CH_3)C_{18}H_{37})_2$ (d)

⊕
$O(H)Me_2$ (e)

⊕
$S(H)Et_2$ (f)

⊕
$P(H)Me_3$ (g)

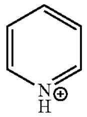

(h)

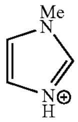

(i)

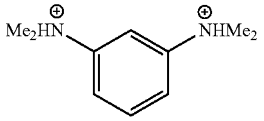

(j)

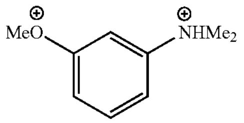

-continued (k)

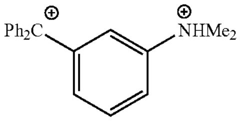

(l)

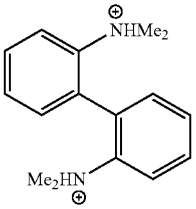

(m)

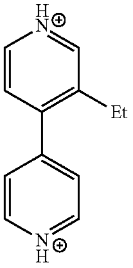

(n)

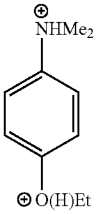

(o)

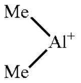

(p)

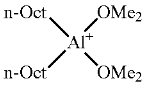

(q)

⊕
$CPh_3$ (r)

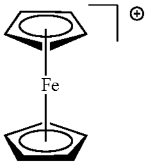

(s)

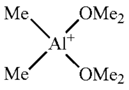

(t)

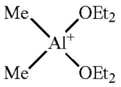

and (u)

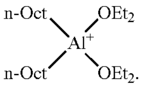

In other embodiments of Embodiment A each hydrocarbyl and/or heterohydrocarbyl of in $[Y_n—X-L_m]$ is independently substituted with one or more substituents $R^s$; and each $R^s$ is independently a halogen atom, polyfluoro substitution, perfluoro substitution, $F_3C—$, $FCH_2O—$, $F_2HCO—$, $F_3CO—$, $R_3Si—$, $R_3Ge—$, RO—, RS—, RS(O)—, $RS(O)_2—$, $R_2P—$, $R_2N—$, $R_2C{=}N—$, NC—, RC(O)O—, ROC(O)—, RC(O)N(R)—, or $R_2NC(O)—$, wherein each R independently is an unsubstituted $(C_1\text{-}C_{18})$alkyl.

In one embodiment, for Structure 1, Embodiment B hereinafter, each of $R_1$ through $R_{12}$ is unsubstituted; and/or wherein, for Structure 2, Embodiment C hereinafter, each of $R_{13}$ through $R_{24}$ is unsubstituted. In one embodiment, for Structure 1, two or more of $R_1$ through $R_{12}$ form one or more ring structures, wherein said ring structures have from 3 to 50 atoms in the ring excluding any hydrogen atoms; and/or wherein for Structure 2, two or more of $R_{13}$ through $R_{24}$ form one or more ring structures, wherein said ring structures have from 3 to 50 atoms in the ring, excluding any hydrogen atoms.

In some Embodiments of Embodiment B, $R_1$ is hydrogen, halogen or unsubstituted $C_1$-$C_{18}$ alkyl, $C_1$-$C_6$ alkoxy($C_1$-$C_6$) alkylamino, di($C_2$-$C_6$)alkyl-($C_2$-$C_a$)alkenylsilyl, halo($C_1$-$C_6$)alkoxy, tri($C_1$-$C_6$)alkylsilyl, tri($C_1$-$C_6$)alkylsilyloxy, halo ($C_1$-$C_6$)alkyl, tri(di($C_1$-$C_6$)alkylamino)silyl, $C_1$-$C_6$ alkoxy, $C_1$-$C_6$ alkylthio, thio, $C_2$-$C_6$ alkanoyl, tri($C_1$-$C_6$)alkyloxysilyl, di($C_1$-$C_6$)alkylamino, tri($C_1$-$C_6$)alkylgermyl, tri(di($C_1$-$C_6$)alkylamino)germyl, tri($C_1$-$C_6$)alkyloxygermyl, di($C_1$-$C_6$)alkylphosphaneyl, di(di($C_1$-C)alkylamino)phosphaneyl, mono- or di($C_1$-$C_{20}$)alkylamino, amino, hydroxy, phenyl, or trifluormethanesulfonyloxy.

In other Embodiments of Embodiment B, $R_1$ is a hydrocarbyl containing a terminal olefin. Examples of hydrocarbyl groups containing a terminal olefin can be represented by the formula $(CH_2{=}CH)$-D- where D represents $C_1$-$C_{18}$ alkyl or $C_0$-$C_6$ alkylphenyl($C_0$-$C_6$)alkyl. Examples of such hydrocarbyl groups include allyl, 3-buten-1-yl, 5-hexen-1-yl, and 4-vinylbenzyl.

In other Embodiments of Embodiment B, $R_1$ is a heterohydrocarbyl containing a terminal olefin. Examples of hydrocarbyl groups containing a terminal olefin can be represented by the formula $(CH_2{=}CH)$-D- where D represents $C_1$-$C_{18}$ alkyl where at least one carbon atom, CH group, or $CH_2$ group is replaced with a hetero atom selected from N, O, S, or Si or a heteroaryl or heterocycloalkyl group. Examples of such hydrocarbyl groups include (1-vinylpiperidin-4-yl)methyl, 4-(vinylamino)butyl, (2-(vinylamino) ethoxy)methyl, and (4-penten-1-yloxy)methyl, (1-allyl-1H-imidazol-4-yl)methyl, and ((6-allylpyridin-3-yl)methoxy) methyl.

In some Embodiments of Embodiment C, $R_1$ is hydrogen, halogen or unsubstituted $C_1$-$C_{16}$ alkyl, $C_1$-$C_6$ alkoxy($C_1$-$C_6$) alkylamino, di($C_1$-$C_6$)alkyl-($C_2$-$C_6$)alkenylsilyl, halo($C_1$-$C_6$)alkoxy, tri($C_1$-$C_6$)alkylsilyl, tri($C_1$-$C_6$)alkylsilyloxy, halo ($C_1$-$C_6$)alkyl, tri(di($C_1$-$C_6$)alkylamino)silyl, $C_1$-$C_6$ alkoxy, $C_1$-$C_6$ alkylthio, thio, $C_2$-$C_6$ alkanoyl, tri($C_1$-$C_6$)alkyloxysilyl, di($C_1$-$C_6$)alkylamino, tri($C_1$-$C_B$)alkylgermyl, tri(di($C_1$-$C_6$)alkylamino)germyl, tri($C_1$-$C_6$)alkyloxygermyl, di($C_1$-$C_6$)alkylphosphaneyl, di(di($C_1$-C)alkylamino)phosphaneyl, mono- or di($C_1$-$C_{20}$)alkylamino, amino, hydroxy, phenyl, or trifluormethanesulfonyloxy.

In other Embodiments of Embodiment C, $R_1$ is a hydrocarbyl containing a terminal olefin. Examples of such hydrocarbyl groups include allyl, 3-buten-1-yl, 5-hexen-1-yl, and 4-vinylbenzyl.

In other Embodiments of Embodiment C, $R_1$ is a heterohydrocarbyl containing a terminal olefin. Examples of hydrocarbyl groups containing a terminal olefin can be represented by the formula $(CH_2{=}CH)$-D- where D represents $C_1$-$C_{18}$ alkyl where at least one carbon atom, CH group, or $CH_2$ group is replaced with a hetero atom selected from N, O, S, or Si or a heteroaryl or heterocycloalkyl group. Examples of such hydrocarbyl groups include (1-vinylpiperidin-4-yl)methyl, 4-(vinylamino)butyl, (2-(vinylamino) ethoxy)methyl, and (4-penten-1-yloxy)methyl, (1-allyl-1H-imidazol-4-yl)methyl, and ((6-allyipyridin-3-yl)methoxy) methyl.

In one embodiment, for Structure 1, none of $R_1$ through $R_{12}$ form ring structures; and/or wherein for Structure 2, none of $R_{13}$ through $R_2$: form ring structures. In one embodiment, for Structures 1 or 2, the cocatalyst comprises at least three halogen atoms, or at least 4 halogen atoms, or at least 5 halogen atoms, or at least 6 halogen atoms. In one embodiment, the cocatalyst comprises a structure selected from the following 1) through 95) (in each structure below, each black dot represents a boron atom):

1)

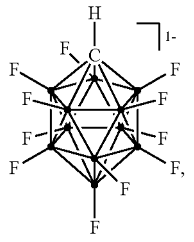

2)

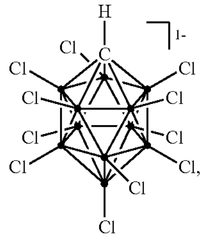

3)

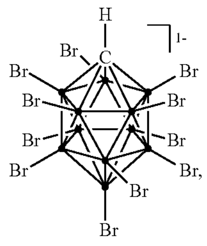

4)

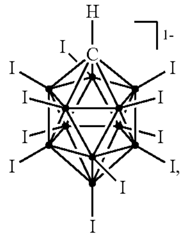

-continued
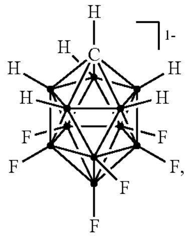
5)
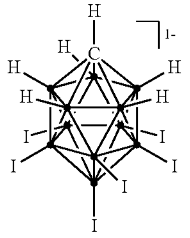
6)
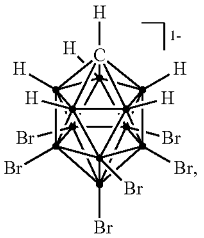
7)
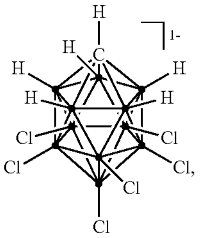
8)
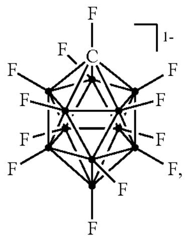
9)
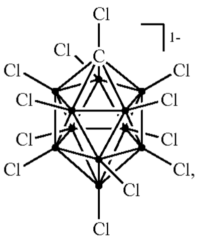
10)
-continued
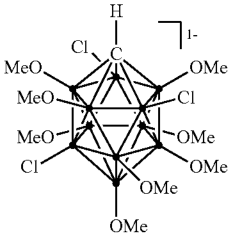
11)
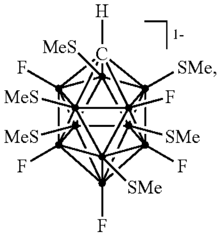
12)
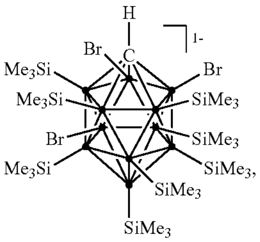
13)
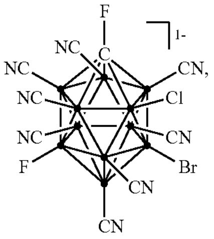
14)
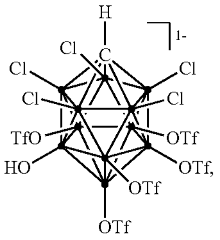
15)
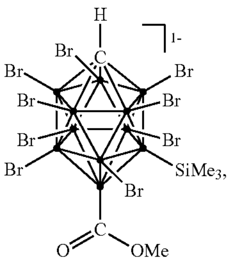
16)

-continued
17)
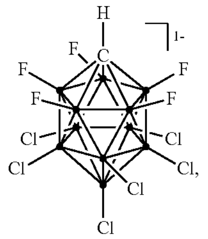
18)
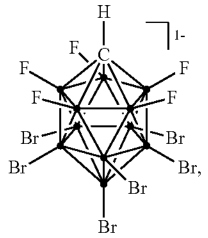
19)
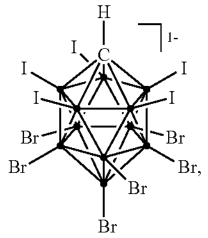
20)
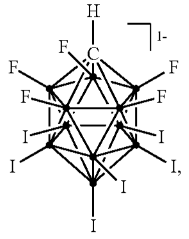
21)
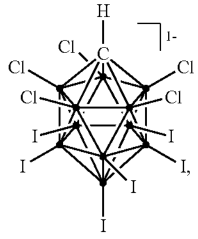
22)
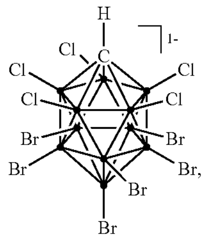
-continued
23)
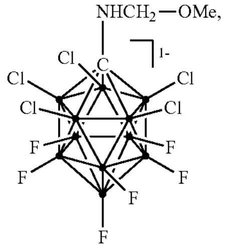
24)
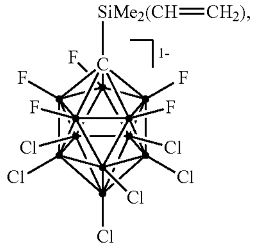
25)
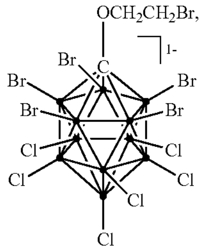
26)
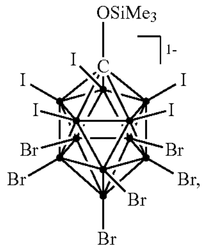
27)
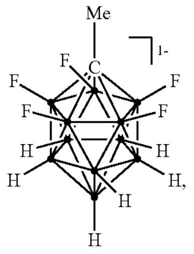
28)
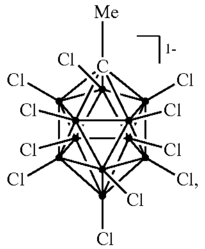

-continued
29)
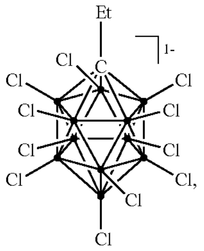
30)
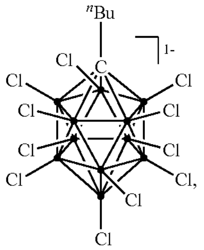
31)
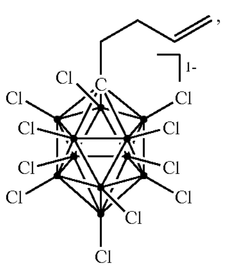
32)
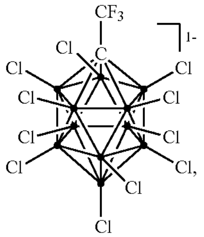
33)
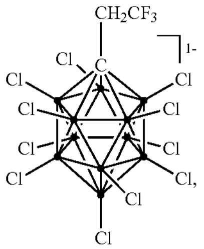
34)
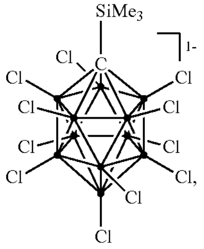
-continued
35)
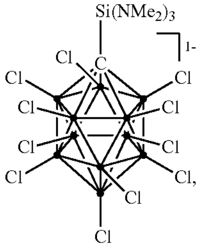
36)
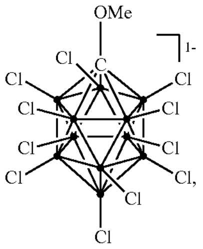
37)
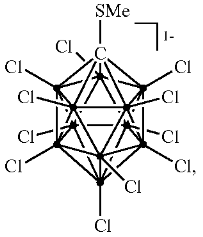
38)
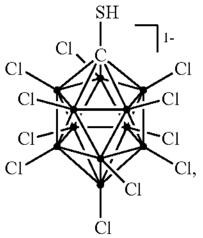
39)
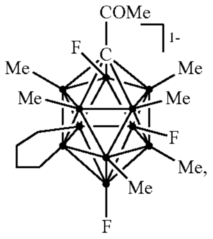
40)
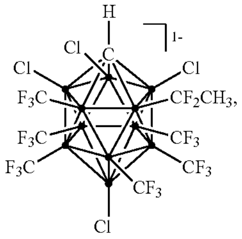

-continued
41)
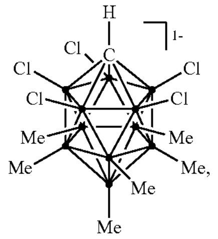
42)
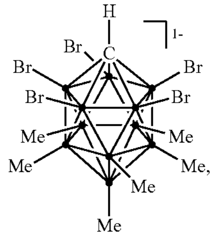
43)
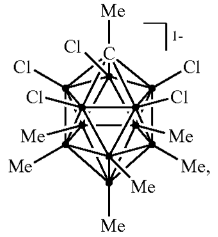
44)
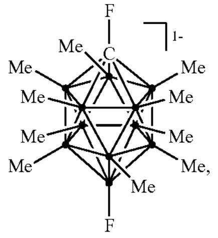
45)
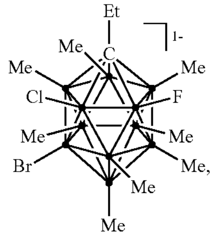
46)
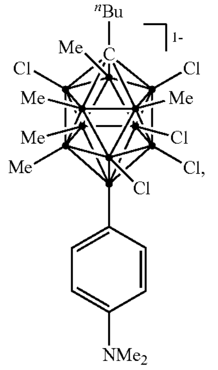
-continued
47)
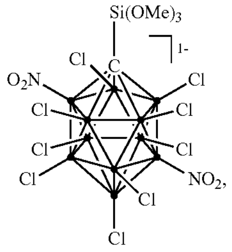
48)
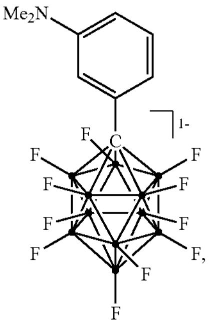
49)
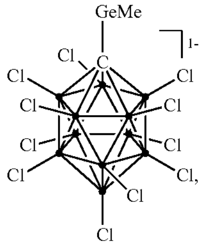
50)
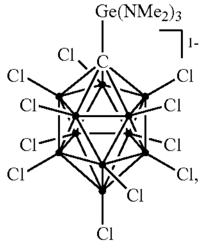
51)
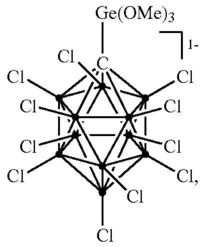
52)
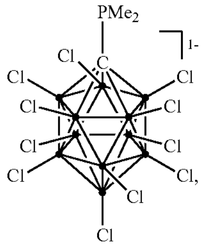

-continued
53)
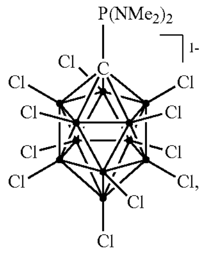
54)
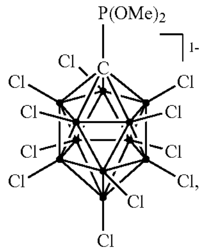
55)
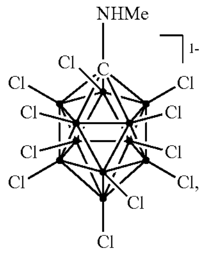
56)
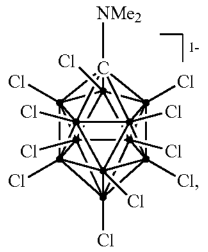
57)
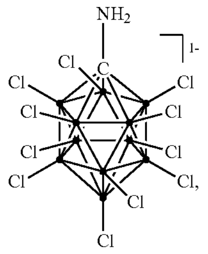
58)
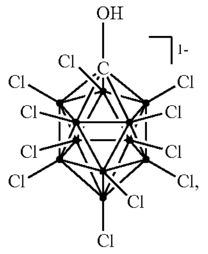
-continued
59)
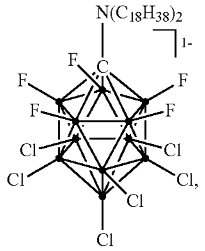
60)
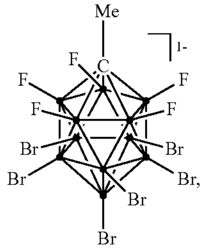
61)
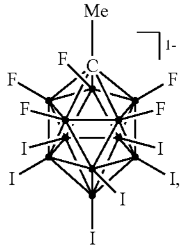
62)
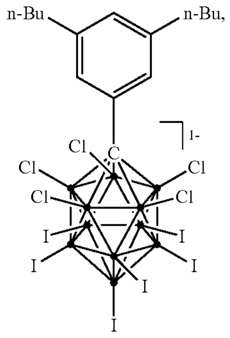
63)
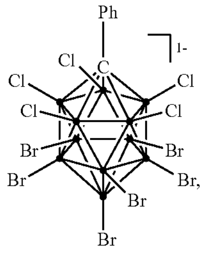
64)
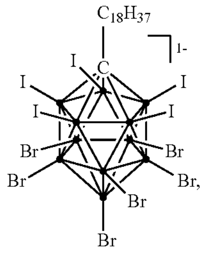

-continued
65)
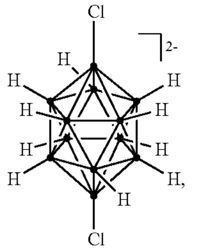
66)
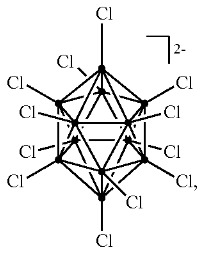
67)
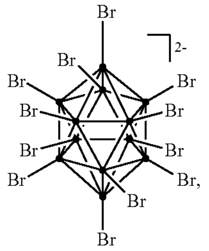
68)
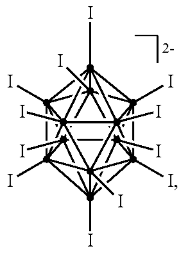
69)
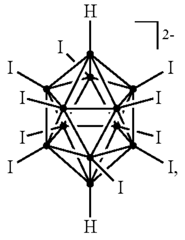
70)
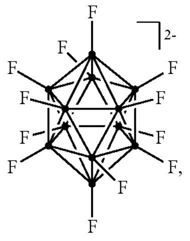
-continued
71)
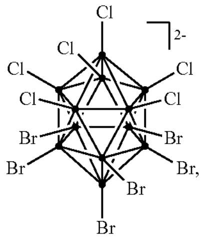
72)
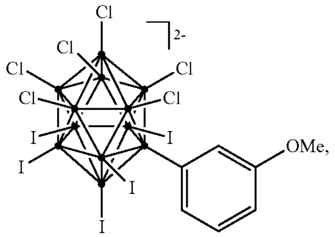
73)
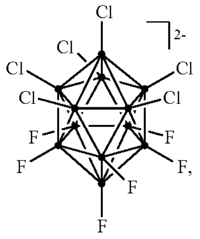
74)
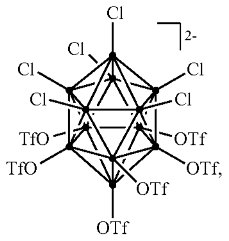
75)
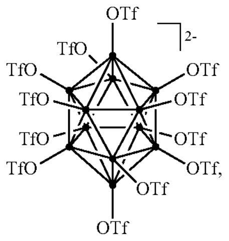
76)
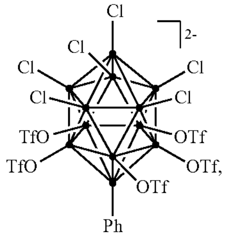

-continued
77)
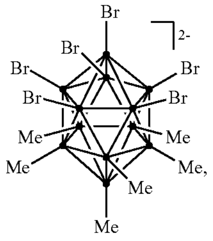
78)
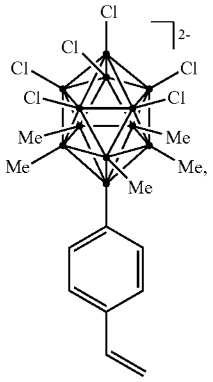
79)
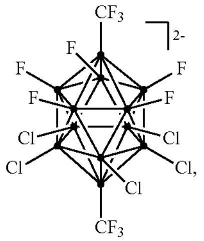
80)
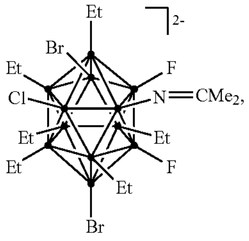
81)
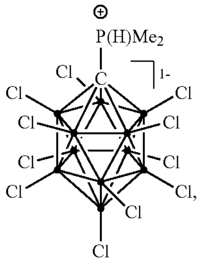
-continued
82)
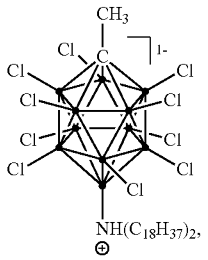
83)
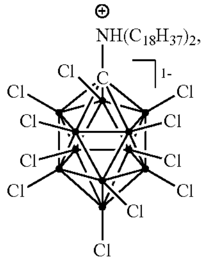
84)
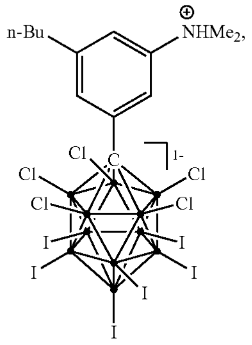
85)
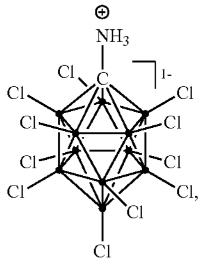
86)
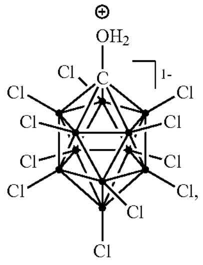

-continued

87)

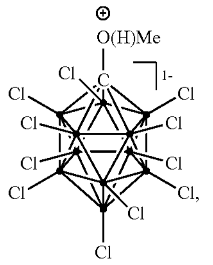

88)

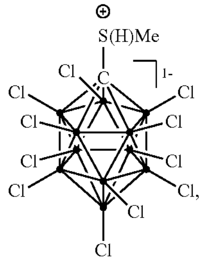

89)

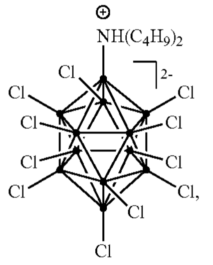

90)

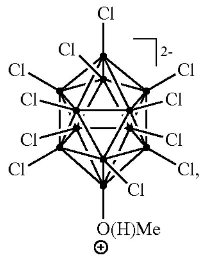

91)

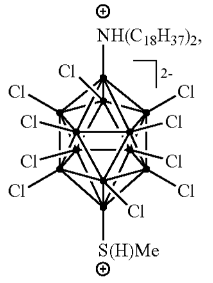

-continued

92)

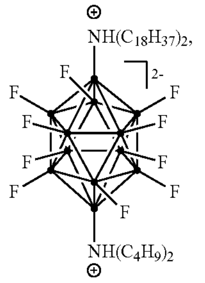

93)

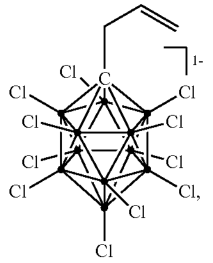

94)

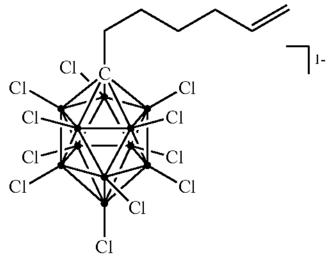

or

95)

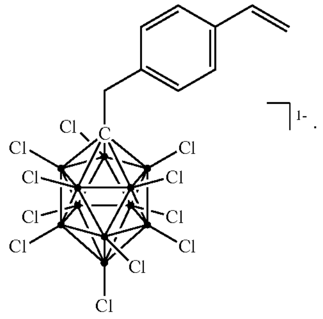

In one embodiment, the cocatalyst comprises a structure selected from the following 1) through 10) above, or from 1) through 5), or from 1) or 2) above.

Examples of suitable procatalysts include phenoxy type transition metal complexes (see, for example, WO2007/136497, WO20071136496 and WO2007/136494), constrained geometry transition metal complexes (see for example, U.S. Pat. Nos. 6,034,022, 6,268,444 and 6,121,185), and bis-metallocene transition metal complexes (see, for example, U.S. Pat. No. 6,245,706). Each patent reference is incorporated herein by reference.

In one embodiment, the procatalysts is selected from the following:

(Structure a)

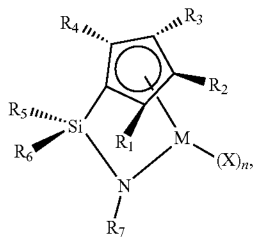

(Structure b)

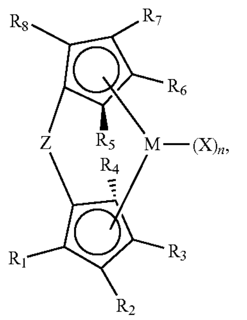

(Structure c)

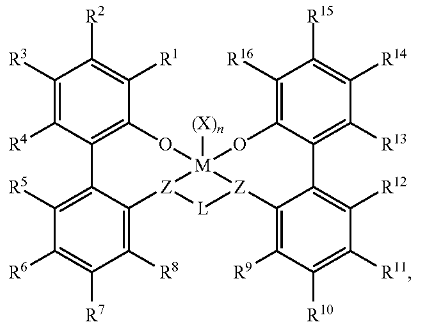

wherein for each of the Structures a through c, each M is independently, titanium, zirconium, or hafnium, each independently being in a formal oxidation state of +2, +3, or +4; and each n is an integer of from 0 to 3, and wherein when n is 0, X is absent; and each X independently is a monodentate ligand that is neutral, monoanionic, or dianionic; or two Xs are taken together to form a bidentate ligand that is neutral, monoanionic, or dianionic; and X and n are chosen in such a way that the metal-ligand complex of formula (I) is, overall, neutral; and wherein for Structure a, $R_1$ through $R_7$, and for Structure b, $R_1$ through $R_7$, and for Structure c, $R_1$ through $R_{16}$, are each, independently selected from the following: a $(C_1-C_{40})$hydro-carbyl, a $(C_1-C_{40})$hetero-hydrocarbyl, a $Si(R^c)_3$, a $Ge(R^c)_3$, a $P(R^P)_2$, a $N(R^N)_2$, an $OR^c$, a $SR^c$, a $NO_2$, a CN, a $CF_3$, a $R^cS(O)$—, a $R^cS(O)_2$—, a $(R^c)_2C{=}N$—, a $R^cC(O)O$—, a $R^cOC(O)$—, a $R^cC(O)N(R)$—, a $(R^c)_2NC(O)$—, a halogen atom, a hydrogen atom, and wherein each of the hydrocarbyl, heterohydrocarbyl, $Si(R^c)_3$, $Ge(R^c)_3$, $P(R^P)_2$, $N(R^N)_2$, $OR^c$, $SR^c$, $R^cS(O)$—, $R^cS(O)_2$—, $(R^c)_2C{=}N$—, $R^cC(O)O$—, $ROC(O)$—, $R^cC(O)N(R)$—, $(R^c)_2NC(O)$—, and wherein each R group, independently, is unsubstituted or substituted with one or more $R^s$ substituents, each $R^s$ independently is selected from a halogen atom, a polyfluoro substitution, a perfluoro substitution, a $F_3C$—, a $FCH_2O$—, a $F_2HCO$—, a $F_3CO$—, a $R_3Si$—, a $R_3Ge$—, a RO—, a RS—, a RS(O)—, a $RS(O)_2$—, a $R_2P$—, a $R_2N$—, a $R_2C{=}N$—, a NC—, a RC(O)O—, a ROC(O)—, a RC(O)N(R)—, or a $R_2NC(O)$—; and wherein for Structure a, $R_1$ through $R_7$, and for Structure b, $R_1$ through $R_7$, and for Structure c, $R_1$ through $R_{16}$, independently, optionally two or more R groups can combine together into one or more ring structures, with such ring structures having from 3 to 50 atoms in the ring excluding any hydrogen atoms; and wherein for Structure c, each Z independently is O, S, $N(C_1-C_{40})$hydrocarbyl, or $P(C_1-C_{40})$hydrocarbyl; and wherein for Structure c, L is $(C_1-C_{40})$hydrocarbylene or $(C_1-C_{40})$heterohydro-carbylene, wherein the $(C_1-C_{40})$hydrocarbylene has a portion that comprises a 3-carbon atom to 10-carbon atom linker backbone linking the Z atoms in Structure c (to which L is bonded), and the $(C_1-C_{40})$heterohydrocarbylene has a portion that comprises a 3-atom to 10-atom linker backbone linking the Z atoms in formula (I), wherein each of the 3 to 10 atoms of the 3-atom to 10-atom linker backbone of the $(C_1-C_{40})$heterohydrocarbylene independently is a carbon atom or heteroatom, wherein each heteroatom independently is O, S, S(O), $S(O)_2$, $Si(R^c)_2$, $Ge(R^c)_2$, $P(R^c)$, or $N(R^c)$, wherein independently each $R^c$ is, independently, a $(C_1-C_{30})$hydrocarbyl, or is absent.

In one embodiment, the procatalyst is selected from Structure c, as described above.

Some examples of the phenoxy type complexes (Structure c) include, but are not limited to, the following: bis((2-oxoyl-3-(1,2,3,4,6,7,8,9-octahydroanthracen-5-yl)-5-(methyl)pheny1)-2-phenoxy)propane1,2-diylzirconium (IV) dimethyl; bis((2-oxoyl-3-(1,2,3,4,6,7,8,9-octahydroanthracen-5-yl)-5-(methyl)pheny1)-2-phenoxy)propane-1,2-diylzirconium (IV) dichloride; bis((2-oxoyl-3-(dibenzo-1H-pyrrole-1-yl)-5-(methyl)phenyl)-2-phenoxy)propane-1,2-diylzirconium (IV) dimethyl; bis((2-oxoyl-3-(dibenzo-1H-pyrrole-1-yl)-5-(methyl)-phenyl)-2-phenoxy)propane-1,2-diylzirconium(IV) dichloride; bis((2-oxoyl-3-(1,1-dimethylethyl)phen-1-yl)-5-(methyl)pheny1)-2-phen oxy) propane-1,2-diylzirconium (IV) dimethyl: bis((2-oxoyl-3-(1,1-dimethylethyl)phen-1-yl)-5-(methyl)phenyl)-2-phenoxy)-propane-1,2-diylzirconium (IV) dichloride; bis ((2-oxoy1-3-(1,2,3,4,6,7,8,9-octahydro-anthracen-5-yl)-5-(methyl)phenyl)-2-phenoxy)-trans-cyclohexane-1,2-dimethyleny1-1; 2-diylzirconium (IV) dimethyl; bis((2-oxoyl-3-(1,2,3,4,6,7,8,9-octahydroanthracen-5-yl)-5-(methyl)pheny1)-2-phenoxy)-transcyclohexane-1,2-dimethylenyl-1,2-diylzirconium (IV) dichloride; bis((2-oxoyl-3-(dibenzo-1H-pyrrole-1-yl)-5-(methyl)phenyl)-2-phenoxy)-trans-cyclohexane-1,2-dimethylenyl-1,2-diyl zirconium (IV) dimethyl; bis((2-oxoyl-3-(dibenzo-1H-pyrrole-1-yl)-5-(methyl)phenyl)-2-phenoxy)-trans-cyclohexane-1,2-dimethylenyl-1,2-diylzirconium (IV) dichloride; bis((2-oxoyl-3-(1,1-dimethylethyl)phen-yl)-5-(methyl)-phenyl)-2-phenoxy)-trans-cyclohexane-1,2-dimethylenyl-1, 2-diylzirconium (IV) dimethyl; bis((2-oxoy1-3-(1,1-dimethylethyl)phen-1-yl)-5-(methyl)phenyl)-2-phenoxy)-transcyclohexane-1,2-dimethylenyl-1,2-diylzirconium (IV) dichloride; bis((2-oxoyl-3-(1,2,3,4,6,7,8,9-octahydro-anthracen-5-yl)-5-(methyl)pheny1)-2-phenoxy)-cis-cyclohexane-1,3-diylzirconium (N)dimethyl; bis((2-oxoy1-3-(1,2,3,4,6,7,8,9-octahydroanthracen-5-yl)-5-(methyl)phenyl)-2-phenoxy)-cis-cyclohexane-1,3-diylzirconium (IV) dichloride; bis((2-oxoyl-3-(dibenzo-1H-pyrrole-1-yl)-5-(methyl)phenyl)-2-phenoxy)-cis-cyclohexane-1,3-diylzirconium (N) dimethyl; and bis((2-oxoyl-3-(dibenzo-H-pyrrole-1-yl)-5-(methyl)pheny1)-2-phenoxy)-cis-cyclohexane-1,3-diylzirconium (IV) dichloride.

In one embodiment, the procatalysts is selected from Structure a, as described above.

Some examples of the constrained geometry complexes (Structure a) include, but are not limited to, the following: (tert-butylamido)(1,1-dimethyl-2,3,4,9-hexahydronaphthalenyl) dimethylsilanetitaniumdimethyl; (tert-butylamido)(1,1,2,3-tetramethyl-2,3,4,9,10-11-1,4,5,6,7,8-hexahydronaphthalenyl) dimethylsilanetitaniumdimethyl; (tert-butylamido)-(tetramethy1-5-cyclopentadienyl) dimethylsilanetitanium dibenzyl; (tert-butylamido)-(tetramethy1-15-cyclopentadienyl) dimethylsilanetitanium dimethyl; (tert-butylamido)(tetra-methyl-5-cyclopentadienyl)-1,2-ethanediyltitanium dimethyl; (tert-butylamido)(tetramethyl-15-cyclopentadienyl) dimethylsilane titanium (II) 2-(dimethylamino)benzyl; (tert-butylamido)(tetramethy1-15-cyclo-pentadienyl) dimethylsilanetitanium (III) 2,4-dimethyl-pentadienyl; (tert-butylamido)-(tetramethyl-15-cyclopentadienyl) dimethylsilanetitanium (II) 1,4-diphenyl-1,3-butadiene; (tert-butylamido)(tetramethy1-15-cyclopentadienyl) dimethylsilanetitanium (II) 1,3-pentadiene; (tert-butylamido)(2-methylindenyl) dimethylsilanetitanium (II) 1,4-diphenyl-1,3-butadiene; (tert-butylamido)(2 methylindenyl)-dimethylsilanetitanium (II) 2,4-hexadiene; and (tertbutyl-amido)(2-methylindenyl) dimethylsilanetitanium (IV) 2,3-dimethyl-1,3-butadiene.

In one embodiment, the procatalysts is selected from Structure b, as described above.

Some examples of the bis-metallocene complexes (Structure b) include, but are not limited to, the following: bis(cyclopentadienyl) zirconium dimethyl; bis(cyclopentadienyl) zirconium diethyl; bis(cyclopentadienyl)zirconium dipropyl; bis(cyclopentadienyl) zirconium dibutyl; bis(cyclopentadienyl) zirconium diphenyl; bis(cyclopentadienyl) zirconium dineopentyl; bis(cyclopentadienyl) zirconium di(m-tolyl); bis(cyclopentadienyl) zirconium di(p-tolyl); bis(tbutylcyclopentadienyl) zirconium dimethyl; bis-(tbutylcyclo-pentadienyl) zirconium dimethyl; and bis(cyclohexylmethylcyclopentadienyl) zirconium dimethyl.

In one embodiment, the cocatalyst comprises a structure selected from Structure 1. In a further embodiment, the cocatalyst structure further comprises at least one cation selected from the following structures a)-j), r) or q), each as described above.

In one embodiment, for Structure 1, the hydrocarbyl and/or the heterohydrocarbyl is/are each independently substituted with one or more substituents RS; and each RS is independently a halogen atom, polyfluoro substitution, perfluoro substitution, F3C—, FCH2O—, $F_2HCO$—, $F_3CO$—, $R_3Si$—, $R_3Ge$—, RO—, RS—, RS(O)—, $RS(O)_2$—, $R_2P$—, $R_2N$—, $R_2C$═N—, NC—, RC(O)O—, ROC(O)—, RC(O)N(R)—, or $R_2NC(O)$—, wherein each R independently is an unsubstituted ($C_1$-$C_{18}$)alkyl.

In one embodiment, for Structure 1, wherein each of $R_1$ through $R_{12}$ is unsubstituted.

In one embodiment, for Structure 1, two or more of $R_1$ through $R_{12}$ form one or more ring structures, wherein said ring structures have from 3 to 50 atoms in the ring, excluding any hydrogen atoms.

In one embodiment, for Structure 1, none of $R_1$ through $R_{12}$ form ring structures.

In one embodiment, for Structure 1, the cocatalyst comprises at least three halogen atoms, or at least 4 halogen atoms, or at least 5 halogen atoms, or at least 6 halogen atoms.

Structure 1 may comprise of a combination of two or more embodiments described herein.

In one embodiment, the cocatalyst comprises a structure selected from Structure 2. In a further embodiment, the cocatalyst structure further comprises at least one cation selected from the following structures k)-p), each as described above.

In one embodiment, for Structure 2, the hydrocarbyl and/or the heterohydrocarbyl is/are each independently substituted with one or more substituents $R^s$; and each $R^s$ is independently a halogen atom, polyfluoro substitution, perfluoro substitution, $F_3C$—, $FCH_2O$—, $F_2HCO$—, $F_3CO$—, $R_3Si$—, $R_3Ge$—, RO—, RS—, RS(O)—, $RS(O)_2$—, $R_2P$—, $R_2N$—, $R_2C$═N—, NC—, RC(O)O—, ROC(O)—, RC(O)N(R)—, or $R_2NC(O)$—, wherein each R independently is an unsubstituted ($C_1$-$C_{18}$)alkyl.

In one embodiment, for Structure 2, each of $R_{13}$ through $R_{24}$ is unsubstituted.

In one embodiment, for Structure 2, two or more of $R_{13}$ through $R_{24}$ form one or more ring structures, wherein said ring structures have from 3 to 50 atoms in the ring excluding any hydrogen atoms. In one embodiment, for Structure 2, none of $R_{13}$ through $R_{24}$ form ring structures.

In one embodiment, for Structure 2, the cocatalyst comprises at least three halogen atoms, further at least 4 halogen atoms, further at least 5 halogen atoms, further at least 6 halogen atoms.

Structure 2 may comprise of a combination of two or more embodiments described herein.

Also is provided is a polymer composition comprising the polymer product of the following: ethylene or propylene with one or more α-olefin copolymers and/or one or more dienes, and wherein the polymer product is polymerized in the presence of the catalyst system of any one of the previous claims.

Also is provided a process for producing a polymer composition, said process comprising: selecting ethylene or propylene; and polymerizing said ethylene or propylene, with one or more α-olefin copolymers and/or one or more dienes, in the presence of the catalyst system of any one of claims 1 to 19.

In one embodiment, the polymerization temperature is from −20° C. to 350° C.

Also is provided is an article comprising at least one component formed from an inventive polymer composition.

A generic synthesis for a cocatalyst, as described herein, is as follows.

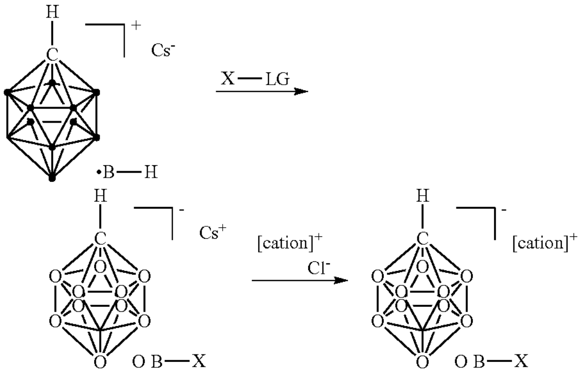

X = substituent such as halogen or alkyl group
LG = leaving group

Definitions

Unless stated to the contrary, all test methods are current as of the filing date of this disclosure.

The term "substituted," as used herein, with respect to a chemical compound, refers to a substituent, i.e., a group that replaces a hydrogen on, for example, a carbon atom, that comprises at least one carbon atom or, preferably, at least one heteroatom (for example, O, S, N, P, etc.). Substituents include, but are not limited to, the $R^S$ substituents, as noted above, as the following: a halogen atom, a polyfluoro substituent, a perfluoro substituent, $F_3C$—, $FCH_2O$—, $F_2HCO$—, $F_3CO$—, $(R)_3Si$—, $(R)_3Ge$—, (R)O—, (R)S—, (R)S(O)—, $(R)S(O)_2$—, $(R)_2P$—, $(R)_2N$—, $(R)_2C{=}N$—, NC, (R)C(O)O—, (R)OC(O)—, (R)C(O)N(R)—, and $(R)_2NC(O)$—; wherein each R independently is an unsubstituted $(C_1\text{-}C_{18})$alkyl.

The term "unsubstituted," as used herein, with respect to a chemical compound, refers to the lack of a substituent that comprises at least one heteroatom (for example, O, S, N, P, etc.).

The term "hydrocarbyl," as used herein, refers to a monovalent (monoradical or radical) chemical group containing only hydrogen and carbon atoms. Examples of hydrocarbyl groups are alkyl groups, alkenyl groups, cycloalkyl groups, and aryl groups. The term "substituted hydrocarbyl," as used herein, refers to a hydrocarbyl, in which at least one hydrogen atom is substituted with a substituent that comprises at least one heteroatom.

The term "heterohydrocarbyl," as used herein, refers to a hydrocarbyl, in which at least one carbon atom, or CH group, or CH2 group, is replaced with a heteroatom or a chemical group containing at least one heteroatom. Examples of such heterohydrocarbyl groups are $CH_3O$— (methoxy), $CH_3CH_2NH$— (ethylamino), $(CH_3CH_2)_2NC_6H_4$-(dimethylaminophenyl), $CH_3OCH_2CH_2OCH_2$— (methoxyethoxymethyl). Heteroatoms include, but are not limited to, O, N, P, Si and S. Other examples of heterohydrocarbyl groups include heterocycloalkyl groups such as piperidinyl, piperazinyl, morpholinyl, furyl, pyrrolidin-1-ylmethyl, azepan-1-ylmethyl, and thiazolidin-3-ylmethyl, and heteroaryl groups such as pyridinyl, pyrimidinyl, pyridin-4-ylmethyl, imidazolyl, imidazolylmethyl, thiazolyl, and oxazolyl.

The term "substituted heterohydrocarbyl," as used herein, refers to a heterohydro-carbyl in which at least one hydrogen atom is substituted with a substituent that comprises at least one heteroatom.

The term "hydrocarbylene," as used herein, refers to a divalent (diradical) chemical group containing only hydrogen and carbon atoms. The term "substituted hydrocarbylene," as used herein, refers to a hydrocarbylene, in which at least one hydrogen atom is substituted with a substituent that comprises at least one heteroatom.

The term "heterohydrocarbylene," as used herein, refers to a hydrocarbylene, in which at least one carbon atom, or CH group, or $CH_2$ group, is substituted with a heteroatom or a chemical group containing at least one heteroatom, e.g. —$CH_2CH_2OCH_2CH_2$-(oxydi-(2,1-ethane)diyl), —$CH_2CH_2CH_2CH_2O$— (4-butaneyl-1-oxy), —$OCH_2CH_2O$— (1,2-ethanediyl-bis(oxy)). Heteroatoms include, but are not limited to, O, N, P, Si and S. The term "substituted heterohydrocarbylene," as used herein, refers to a heterohydrocarbylene in which at least one hydrogen atom is substituted with a substituent that comprises at least one heteroatom.

The term "aryl," as used herein, means a phenyl (i.e., monocyclic aryl), or a bicyclic ring system containing at least one phenyl ring or an aromatic bicyclic ring containing only carbon atoms in the aromatic bicyclic ring system. The bicyclic aryl can be azulenyl, naphthyl, or a phenyl fused to a monocyclic cycloalkyl, a monocyclic cycloalkenyl, or a monocyclic heterocyclyl. The bicyclic aryl is attached to the parent molecular moiety through any carbon atom contained within the phenyl portion of the bicyclic system, or any carbon atom with the napthyl or azulenyl ring. The fused monocyclic cycloalkyl or monocyclic heterocyclyl portions of the bicyclic aryl are optionally substituted with one or two oxo and/or thioxo groups. Representative examples of the bicyclic aryls include, but are not limited to, azulenyl, naphthyl, dihydroinden-1-yl, dihydroinden-2-yl, dihydroinden-3-yl, dihydroinden-4-yl, 2,3-dihydroindol-4-yl, 2,3-dihydroindol-5-yl, 2,3-dihydroindol-6-yl, 2,3-dihydroindol-7-yl, inden-1-yl, inden-2-yl, inden-3-yl, inden-4-yl, dihydronaphthalen-2-yl, dihydronaphthalen-3-yl, dihydronaphthalen-4-yl, dihydronaphthalen-1-yl, 5,6,7,8-tetrahydronaphthalen-1-yl, 5,6,7,8-tetrahydronaphthalen-2-yl, 2,3-dihydrobenzofuran-4-yl, 2,3-dihydrobenzofuran-5-yl, 2,3-dihydrobenzofuran-6-yl, 2,3-dihydrobenzofuran-7-yl, benzo[d][1,3]dioxol-4-yl, benzo[d][1,3]dioxol-5-yl, 2H-chromen-2-on-5-yl, 2H-chromen-2-on-6-yl, 2H-chromen-2-on-7-yl, 2H-chromen-2-on-8-yl, isoindoline-1,3-dion-4-yl, isoindoline-1,3-dion-5-yl, inden-1-on-4-yl, inden-1-on-5-yl, inden-1-on-6-yl, inden-1-on-7-yl, 2,3-dihydrobenzo[b][1,4]dioxan-5-yl, 2,3-dihydrobenzo[b][1,4]dioxan-6-yl, 2H-benzo[b][1,4]oxazin3(4H)-on-5-yl, 2H-benzo[b][1,4]oxazin3(4H)-on-6-yl, 2H-benzo[b][1,4]oxazin3(4H)-on-7-yl, 2H-benzo[b][1,4]oxazin3(4H)-on-8-yl, benzo[d]oxazin-2(3H)-on-5-yl, benzo[d]oxazin-2(3H)-on-6-yl, benzo[d]oxazin-2(3H)-on-7-yl, benzo[d]oxazin-2(3H)-on-8-yl, quinazolin-4(3H)-on-5-yl, quinazolin-4(3H)-on-6-yl, quinazolin-4(3H)-on-7-yl, quinazolin-4(3H)-on-8-yl, quinoxalin-2(1H)-on-5-yl, quinoxalin-2(1H)-on-6-yl, quinoxalin-2(1H)-on-7-yl, quinoxalin-2(1H)-on-8-yl, benzo[d]thiazol-2(3H)-on-4-yl, benzo[d]thiazol-2(3H)-on-5-yl, benzo[d]thiazol-2(3H)-on-6-yl, and, benzo[d]thiazol-2(3H)-on-7-yl. In certain embodiments, the bicyclic aryl is (i) naphthyl or (ii) a phenyl ring fused to either a 5 or 6 membered monocyclic cycloalkyl, a 5 or 6 membered monocyclic cycloalkenyl, or a 5 or 6 membered monocyclic heterocyclyl, wherein the fused cycloalkyl, cycloalkenyl, and heterocyclyl groups are optionally substituted with one or two groups which are independently oxo or thioxo.

The term "cycloalkyl" or "cyclyl" as used herein, means a monocyclic or a bicyclic cycloalkyl ring system. Monocyclic ring systems are cyclic hydrocarbon groups containing from 3 to 8 carbon atoms, where such groups can be saturated or unsaturated, but not aromatic. In certain embodiments, cycloalkyl groups are fully saturated. Examples of monocyclic cycloalkyls include cyclopropyl, cyclobutyl, cyclopentyl, cyclopentenyl, cyclohexyl, cyclohexenyl, cycloheptyl, and cyclooctyl. Bicyclic cycloalkyl ring systems are bridged monocyclic rings or fused bicyclic rings. Bridged monocyclic rings contain a monocyclic cycloalkyl ring where two non-adjacent carbon atoms of the monocyclic ring are linked by an alkylene bridge of between one and three additional carbon atoms (i.e., a bridging group of the form —$(CH_2)_w$—, where w is 1, 2, or 3). Representative examples of bicyclic ring systems include, but are not limited to, bicyclo[3.1.1]heptane, bicyclo[2.2.1]heptane, bicyclo[2.2.2]octane, bicyclo[3.2.2]nonane, bicyclo[3.3.1]nonane, and bicyclo[4.2.1]nonane. Fused bicyclic cycloalkyl ring systems contain a monocyclic cycloalkyl ring fused to either a phenyl, a monocyclic cycloalkyl, a monocyclic cycloalkenyl, a monocyclic heterocyclyl, or a monocyclic heteroaryl. The bridged or fused bicyclic cycloalkyl is attached to the parent molecular moiety through any carbon atom contained within the monocyclic cycloalkyl ring.

Cycloalkyl groups are optionally substituted with one or two groups which are independently oxo or thioxo. In certain embodiments, the fused bicyclic cycloalkyl is a 5 or 6 membered monocyclic cycloalkyl ring fused to either a phenyl ring, a 5 or 6 membered monocyclic cycloalkyl, a 5 or 6 membered monocyclic cycloalkenyl, a 5 or 6 membered monocyclic heterocyclyl, or a 5 or 6 membered monocyclic heteroaryl, wherein the fused bicyclic cycloalkyl is optionally substituted by one or two groups which are independently oxo or thioxo.

The term "halo" or "halogen" as used herein, means —Cl, —Br, —I or —F.

The terms "haloalkyl" and "haloalkoxy" refer to an alkyl or alkoxy group, as the case may be, which is substituted with one or more halogen atoms.

The term "heteroaryl," as used herein, means a monocyclic heteroaryl or a bicyclic ring system containing at least one heteroaromatic ring. The monocyclic heteroaryl can be a 5 or 6 membered ring. The 5 membered ring consists of two double bonds and one, two, three or four nitrogen atoms and optionally one oxygen or sulfur atom. The 6 membered ring consists of three double bonds and one, two, three or four nitrogen atoms. The 5 or 6 membered heteroaryl is connected to the parent molecular moiety through any carbon atom or any nitrogen atom contained within the heteroaryl. Representative examples of monocyclic heteroaryl include, but are not limited to, furyl, imidazolyl, isoxazolyl, isothiazolyl, oxadiazolyl, oxazolyl, pyridinyl, pyridazinyl, pyrimidinyl, pyrazinyl, pyrazolyl, pyrrolyl, tetrazolyl, thiadiazolyl, thiazolyl, thienyl, triazolyl, and triazinyl. The bicyclic heteroaryl consists of a monocyclic heteroaryl fused to a phenyl, a monocyclic cycloalkyl, a monocyclic cycloalkenyl, a monocyclic heterocyclyl, or a monocyclic heteroaryl. The fused cycloalkyl or heterocyclyl portion of the bicyclic heteroaryl group is optionally substituted with one or two groups which are independently oxo or thioxo. When the bicyclic heteroaryl contains a fused cycloalkyl, cycloalkenyl, or heterocyclyl ring, then the bicyclic heteroaryl group is connected to the parent molecular moiety through any carbon or nitrogen atom contained within the monocyclic heteroaryl portion of the bicyclic ring system. When the bicyclic heteroaryl is a monocyclic heteroaryl fused to a benzo ring, then the bicyclic heteroaryl group is connected to the parent molecular moiety through any carbon atom or nitrogen atom within the bicyclic ring system. Representative examples of bicyclic heteroaryl include, but are not limited to, benzimidazolyl, benzofuranyl, benzothienyl, benzoxadiazolyl, benzoxathiadiazolyl, benzothiazolyl, cinnolinyl, 5,6-dihydroquinolin-2-yl, 5,6-dihydroisoquinolin-1-yl, furopyridinyl, indazolyl, indolyl, isoquinolinyl, naphthyridinyl, quinolinyl, purinyl, 5,6,7,8-tetrahydroquinolin-2-yl, 5,6,7,8-tetrahydroquinolin-3-yl, 5,6,7,8-tetrahydroquinolin-4-yl, 5,6,7,8-tetrahydroisoquinolin-1-yl, thienopyridinyl, 4,5,6,7-tetrahydrobenzo[c][1,2,5]oxadiazolyl, 2,3-dihydrothieno[3,4-b][1,4]dioxan-5-yl, and 6,7-dihydrobenzo[c][1,2,5]oxadiazol-4(5H)-onyl. In certain embodiments, the fused bicyclic heteroaryl is a 5 or 6 membered monocyclic heteroaryl ring fused to either a phenyl ring, a 5 or 6 membered monocyclic cycloalkyl, a 5 or 6 membered monocyclic cycloalkenyl, a 5 or 6 membered monocyclic heterocyclyl, or a 5 or 6 membered monocyclic heteroaryl, wherein the fused cycloalkyl, cycloalkenyl, and heterocyclyl groups are optionally substituted with one or two groups which are independently oxo or thioxo.

The terms "heterocyclyl" and "heterocycloalkyl" as used herein, mean a monocyclic heterocycle or a bicyclic heterocycle. The monocyclic heterocycle is a 3, 4, 5, 6 or 7 membered ring containing at least one heteroatom independently selected from the group consisting of O, N, and S where the ring is saturated or unsaturated, but not aromatic. The 3 or 4 membered ring contains 1 heteroatom selected from the group consisting of O, N and S. The 5 membered ring can contain zero or one double bond and one, two or three heteroatoms selected from the group consisting of O, N and S. The 6 or 7 membered ring contains zero, one or two double bonds and one, two or three heteroatoms selected from the group consisting of O, N and S. The monocyclic heterocycle is connected to the parent molecular moiety through any carbon atom or any nitrogen atom contained within the monocyclic heterocycle. Representative examples of monocyclic heterocycle include, but are not limited to, azetidinyl, azepanyl, aziridinyl, diazepanyl, 1,3-dioxanyl, 1,3-dioxolanyl, 1,3-dithiolanyl, 1,3-dithianyl, imidazolinyl, imidazolidinyl, isothiazolinyl, isothiazolidinyl, isoxazolinyl, isoxazolidinyl, morpholinyl, oxadiazolinyl, oxadiazolidinyl, oxazolinyl, oxazolidinyl, piperazinyl, piperidinyl, pyranyl, pyrazolinyl, pyrazolidinyl, pyrrolinyl, pyrrolidinyl, tetrahydrofuranyl, tetrahydrothienyl, thiadiazolinyl, thiadiazolidinyl, thiazolinyl, thiazolidinyl, thiomorpholinyl, 1,1-dioxidothiomorpholinyl (thiomorpholine sulfone), thiopyranyl, and trithianyl. The bicyclic heterocycle is a monocyclic heterocycle fused to either a phenyl, a monocyclic cycloalkyl, a monocyclic cycloalkenyl, a monocyclic heterocycle, or a monocyclic heteroaryl. The bicyclic heterocycle is connected to the parent molecular moiety through any carbon atom or any nitrogen atom contained within the monocyclic heterocycle portion of the bicyclic ring system. Representative examples of bicyclic heterocyclyls include, but are not limited to, 2,3-dihydrobenzofuran-2-yl, 2,3-dihydrobenzofuran-3-yl, indolin-1-yl, indolin-2-yl, indolin-3-yl, 2,3-dihydrobenzothien-2-yl, decahydroquinolinyl, decahydroisoquinolinyl, octahydro-1H-indolyl, and octahydrobenzofuranyl. Heterocyclyl groups are optionally substituted with one or two groups which are independently oxo or thioxo. In certain embodiments, the bicyclic heterocyclyl is a 5 or 6 membered monocyclic heterocyclyl ring fused to phenyl ring, a 5 or 6 membered monocyclic cycloalkyl, a 5 or 6 membered monocyclic cycloalkenyl, a 5 or 6 membered monocyclic heterocyclyl, or a 5 or 6 membered monocyclic heteroaryl, wherein the bicyclic heterocyclyl is optionally substituted by one or two groups which are independently oxo or thioxo.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorpo-rated into the polymer structure), and the term interpolymer as defined hereinafter.

Trace amounts of impurities, for example, catalyst residues, may be incorporated into and/or within the polymer.

The term "interpolymer," as used herein, refers to polymers prepared by the poly-merization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers. The term, "olefin-based interpolymer," as used herein, refers to an interpolymer that comprises, in polymerized form, a majority amount of olefin monomer, for example ethylene or propylene (based on the weight of the interpolymer), and at least one comonomer. The term, "olefin-based copolymer," as used herein, refers to a copolymer that comprises, in polymerized form, a majority amount of olefin monomer, for example ethylene or propylene (based on the weight of the copolymer), and a comonomer, as the only two monomer types.

The term, "ethylene-based polymer," as used herein, refers to a polymer that comprises, in polymerized form, a majority amount of ethylene monomer (based on the weight of the polymer), and optionally may comprise one or more comonomers. The term, "ethylene-based interpolymer," as used herein, refers to an interpolymer that comprises, in polymerized form, a majority amount of ethylene monomer (based on the weight of the interpolymer), and at least one comonomer. The term, "ethylene-based copolymer," as used herein, refers to a copolymer that comprises, in polymerized form, a majority amount of ethylene monomer (based on the weight of the copolymer), and a comonomer, as the only two monomer types.

The term, "ethylene/α-olefin interpolymer," as used herein, refers to an interpolymer that comprises, in polymerized form, a majority amount of ethylene monomer (based on the weight of the interpolymer), and at least one α-olefin. The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term, "propylene-based polymer," as used herein, refers to a polymer that comprises, in polymerized form, a majority amount of propylene monomer (based on the weight of the polymer), and optionally may comprise one or more comonomers. The term, "propylene-based interpolymer," as used herein, refers to an interpolymer that comprises, in polymerized form, a majority amount of propylene monomer (based on the weight of the interpolymer), and at least one comonomer. The term, "propylene-based copolymer," as used herein, refers to a copolymer that comprises, in polymerized form, a majority amount of propylene monomer (based on the weight of the copolymer), and a comonomer, as the only two monomer types.

The term, "propylene/α-olefin interpolymer," as used herein, refers to an interpolymer that comprises, in polymerized form, a majority amount of propylene monomer (based on the weight of the interpolymer), and at least one α-olefin. The term, "propylene/α-olefin copolymer," as used herein, refers to a copolymer that comprises, in polymerized form, a majority amount of propylene monomer (based on the weight of the copolymer), and an α-olefin, as the only two monomer types.

The term, "propylene/ethylene interpolymer," as used herein, refers to an inter-polymer that comprises, in polymerized form, a majority amount of propylene monomer (based on the weight of the interpolymer), and ethylene. The term, "propylene/ethylene copolymer," as used herein, refers to a copolymer that comprises, in polymerized form, a majority amount of propylene monomer (based on the weight of the copolymer), and ethylene, as the only two monomer types.

The term "procatalyst," as used herein refers to a transition metal complex, which when activated with a cocatalyst, is capable of polymerizing one or more alpha-olefins. Examples, or procatalysts include, but are not limited to, bis-metallocene complexes, constrained geometry complexes, and phenoxy type complexes.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density—Samples that are measured for density are prepared according to ASTM D-1928. Measurements are made within one hour of sample pressing using ASTM D-792, Method B.

Melt Index—Melt index ($I_2$) is measured in accordance with ASTM-D 1238, Condition 190° C./2.16 kg, and is reported in grams eluted per 10 minutes. Melt flow rate ($I_{10}$) is measured in accordance with ASTM-D 1238, Condition 190° C./10 kg, and is reported in grams eluted per 10 minutes.

Gel Permeation Chromatography (GPC)

The ethylene/alpha-olefin interpolymers were tested for their properties via GPC, according to the following procedure. The GPC system consists of a Waters (Milford, Mass.) 150° C. high temperature chromatograph (other suitable high temperatures GPC instruments include Polymer Laboratories (Shropshire, UK) Model 210 and Model 220) equipped with an on-board differential refractometer (RI). Additional detectors can include an IR4 infra-red detector from Polymer ChAR (Valencia, Spain), Precision Detectors (Amherst, Mass.) 2-angle laser light scattering detector Model 2040, and a Viscotek (Houston, Tex.) 150R 4-capillary solution viscometer. A GPC with the last two independent detectors and at least one of the first detectors is sometimes referred to as "3D-GPC", while the term "GPC" alone generally refers to conventional GPC. Depending on the sample, either the 15-degree angle or the 90-degree angle of the light scattering detector is used for calculation purposes. Data collection is performed using Viscotek TriSEC software, Version 3, and a 4-channel Viscotek Data Manager DM400.

The system is also equipped with an on-line solvent degassing device from Polymer Laboratories (Shropshire, UK). Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of butylated hydroxytoluene (BHT). Both solvents are sparged with nitrogen. The polyethylene samples are gently stirred at 160° C. for four hours. The injection volume is 200 microliters. The flow rate through the GPC is set at 1 ml/minute.

The GPC column set is calibrated before running the Examples by running twenty-one narrow molecular weight distribution polystyrene standards. The molecular weight (MW) of the standards ranges from 580 to 8,400,000 grams per mole, and the standards are contained in 6 "cocktail" mixtures. Each standard mixture has at least a decade of separation between individual molecular weights. The standard mixtures are purchased from Polymer Laboratories (Shropshire, UK). The polystyrene standards are prepared at "0.025 g in 50 mL of solvent" for molecular weights equal to, or greater than, 1,000,000 grams per mole, and at "0.05 g in 50 ml of solvent" for molecular weights less than 1,000,000 grams per mole. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene $M_w$ using the Mark-Houwink K and a (sometimes referred to as a) values mentioned later for polystyrene and polyethylene. See the Examples section for a demonstration of this procedure.

With 3D-GPC, absolute weight average molecular weight ("$M_{w.\ Abs}$") and intrinsic viscosity are also obtained independently from suitable narrow polyethylene standards using the same conditions mentioned previously. These narrow linear polyethylene standards may be obtained from Polymer Laboratories (Shropshire, UK; Part No.'s PL2650-0101 and PL2650-0102).

The systematic approach for the determination of multi-detector offsets is performed in a manner consistent with that published by Balke, Mourey, et al. (Mourey and Balke, *Chromatography Polym*., Chapter 12, (1992)) (Balke, Thitiratsakul, Lew, Cheung, Mourey, *Chromatography Polym*., Chapter 13, (1992)), optimizing triple detector log (Mw and intrinsic viscosity) results from Dow 1683 broad polystyrene (American Polymer Standards Corp.; Mentor, Ohio) or its equivalent to the narrow standard column calibration results from the narrow polystyrene standards calibration curve. The molecular weight data, accounting for detector volume off-set determination, are obtained in a manner consistent with that published by Zimm (Zimm, B. H., *J. Chem. Phys.*, 16, 1099 (1948)) and Kratochvil (Kratochvil, P., *Classical Light Scattering from Polymer Solutions*, Elsevier, Oxford, N.Y. (1987)). The overall injected concentration used in the determination of the molecular weight is obtained from the mass detector area and the mass detector constant derived from a suitable linear polyethylene homopolymer, or one of the polyethylene standards. The calculated molecular weights are obtained using a light scattering constant derived from one or more of the polyethylene standards mentioned and a refractive index concentration coefficient, dn/dc, of 0.104. Generally, the mass detector response and the light scattering constant should be determined from a linear standard with a molecular weight in excess of about 50,000 Daltons. The viscometer calibration can be accomplished using the methods described by the manufacturer or alternatively by using the published values of suitable linear standards such as Standard Reference Materials (SRM) 1475a, 1482a, 1483, or 1484a. The chromatographic concentrations are assumed low enough to eliminate addressing $2^{nd}$ viral coefficient effects (concentration effects on molecular weight).

$M_{w\text{-}gpc}$ Determination

To obtain $M_{w\text{-}gpc}$ values, the chromatographic system consist of either a Polymer Laboratories Model PL-210 or a Polymer Laboratories Model PL-220. The column and carousel compartments are operated at 140° C. Three Polymer Laboratories 10-μm Mixed-B columns are used with a solvent of 1,2,4-trichlorobenzene. The samples are prepared at a concentration of 0.1 g of polymer in 50 mL of solvent. The solvent used to prepare the samples contain 200 ppm of the antioxidant butylated hydroxytoluene (BHT). Samples were prepared by agitating lightly for 4 hours at 160° C. The injection volume used is 100 microliters and the flow rate is 1.0 mL/min. Calibration of the GPC column set is performed with twenty one narrow molecular weight distribution polystyrene standards purchased from Polymer Laboratories. The polystyrene standard peak molecular weights are converted to polyethylene molecular weights using Equation 1A: $M_{polyethylene}$ A $(M_{polystyrene})^B$ (EQN 1A), where M is the molecular weight, A has a value of 0.4315, and B is equal to 1.0. A third order polynomial is determined to build the logarithmic molecular weight calibration as a function of elution volume. Polyethylene equivalent molecular weight calculations are performed using Viscotek TriSEC software Version 3.0. The precision of the weight-average molecular weight M, is excellent at <2.6%.

$^1$H-NMR—$^1$H-NMR-spectra (500 MHz or 400 MHz) were obtained on a Varian VNMRS-500 or VNMRS-400 spectrometer, at 30° C., unless otherwise noted. The chemical shifts were referenced to TMS (6=0.00) in $CDCl_3$.

Experimental

The following examples illustrate the present invention but are not intended to limit the scope of the invention.

Procatalysts (PCAT 1-4)

PCAT1

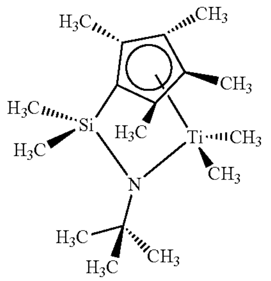

PCAT2

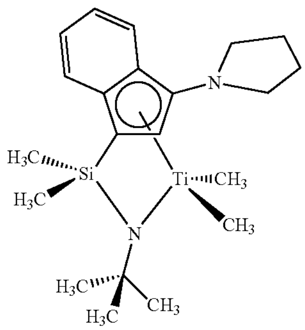

-continued

PCAT3

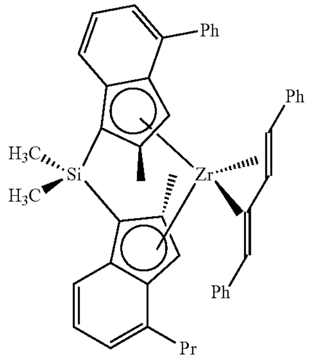

PCAT4

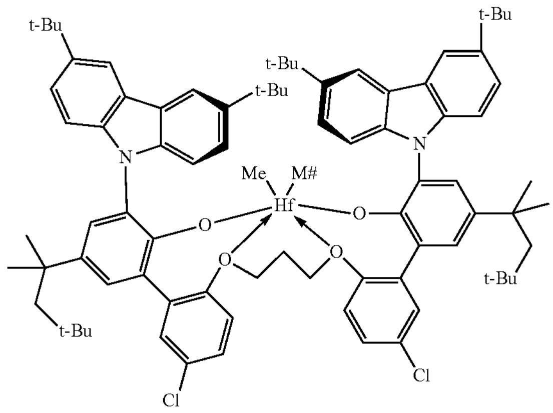

Cocatalysts—1) "An Bor" stands for anilinium Borate $[Me_2N(H)Ph]^+[B(C_6F_5)_4]^-$. 2) "Carb" for anilinium carborane $[Me_2N(H)Ph]^+[HCB_{11}Cl_{11}]^-$. 3) "Bis H borate" for bis(hydrogenated-tallowalkyl)methylammonium tetrakis (pentafluorophenyl)borate $[(C_{18\text{-}22}H_{37\text{-}45})_2N(Me)H]^+[(B(C_6F_5)_4]^-$. Ranges in atoms subscripts depicts that the cation is a mixture of various chain lengths. 4) "Carb-H" for $[Me_2N(H)Ph]^+[HCB_{11}H_{11}]^-$. 5) "Bis H Carb" for $[(C_{18\text{-}22}H_{37\text{-}45})_2N(Me)H]^+[HCB_{11}Cl_{11}]^-$. 6) "Bis H Carb-Me" for $[(C_{18\text{-}22}H_{37\text{-}45})_2N(Me)H]^+[HCB_{11}Me_{11}]^-$.

Synthesis of $[Me_2N(H)Ph]^+[HCB_{11}Cl_{11}]^-$ (Carb)

In Ar filled glovebox, $[Me_2N(H)Ph]Cl$ (74.0 mg, 0.469 mmol) and $Na[HCB_{11}Cl_{11}]$ (255.6 mg, 0.469 mmol) were combined, as solids, in a 50 mL culture tube, and approximately 10 mL of $C_6H_5F$ was added. The mixture was left to stir for 16 h at room temperature (RT). The solution with white precipitate was filtered over a pad of Celite, into a 25 mL Schlenk flask, and the precipitate was washed with 3×2 mL of $C_6H_5F$. Volatiles were removed from the filtrate yielding a white solid. The solid was collected, and rinsed with 3×2 mL of pentane. Solid was transferred to 10 mL Schlenk flask, and dried under vacuum for 2 hours at RT. $^1$H NMR showed approximately 7% residual $C_6H_5F$ (corrected MM 650.8341 g/mol). Yield: 243.4 mg, 0.3740 mmol, 80%. $^1$H NMR, 500 MHz, $(CD_2Cl_2)$: δ 7.94 (s, 1H, N—H), 7.69-7.66 (m, 3H, Ar—H), 7.55 (d, J=8 Hz, 2H, Ar—H), 3.47 (s, 6H, $Me_2NH$-Ph), 3.32 (s, 1H, $HCB_{11}Cl_{11}$).

Synthesis of $[Me_2N(H)Ph]^+[HCB_{11}H_{11}]^-$ (Carb-H)

$Cs[HCB_{11}H_{11}]$ (347.2 mg, 1.26 mmol) was dissolved in approximately 5 mL $H_2O$ at 80° C. A solution of $[Me_2N(H)Ph]Cl$ (198.4 mg, 1.26 mmol) in water was combined with the $Cs[HB_{11}H_{11}]$ solution, and a white precipitate was observed. The mixture was left to stir for two hours, then allowed to cool to RT. The white solid was collected on a glass frit, washed with 3×2 mL $H_2O$, followed by 3×2 mL pentane. The solid was transferred into a 10 mL Schlenk flask, and then dried under vacuum overnight at 40° C. Yield: 182.7 mg, 0.689 mmol, 55%. $^1$H NMR, 500 MHz, $(CD_2Cl_2)$: δ 8.22 (s, 1H, N—H), 7.65-7.61 (m, 3H, Ar—H), 7.55 (d, J=8 Hz, 2H, Ar—H), 3.41 (s, 6H, $Me_2NH$-Ph), 2.50 (s, 1H, $HCB_{11}H_{11}$), 2.26-1.19 (br m, 11H, $HCB_{11}H_{11}$).

Synthesis of $[(C_{18\text{-}22}H_{37\text{-}45})_2N(Me)H]^+$ $[HCB_{11}Cl_{11}]^-$ (Bis H Carb)

In a 50 mL Schlenk flask, a solution of $Na[CHB_{11}Cl_{11}]$ (327 mg, 0.600 mmol) in 10 mL fluorobenzene was added to a solution of $[(C_{18\text{-}22}H_{37\text{-}45})_2N(Me)H]]Cl$ (343 mg, 0.600 mmol) in 10 mL fluorobenzene. Upon mixing, precipitate formed immediately, and the mixture was further stirred for 2 h and filtered through a short pad of Celite. After removing the solvent of the filtrate, the oil was purified by passing the toluene solution through a short pad of Silica gel to yield the title compound. Yield: 570 mg, 0.0538 mmol, 90%. $^1$H NMR (500 MHz, $CD_3CN$): δ 6.78 (brs, 1H, NH), 3.95 (s, 1H, $CHB_{11}Cl_{11}$), 3.02 (t, 4H, $NCH_2$), 2.75 (s, 3H, $NCH_3$), 1.64 (m, 4H, $CH_2$), 1.26-1.32 (m, 60H, $CH_2$), 0.88 (t, J=6.9 Hz, 6H, $CH_3$). $^{13}C\{^1H\}$ NMR (126 MHz, $CD_3CN$): δ 57.1 (s, alpha-$CH_2$, 2C), 47.3 (brs, $CHB_{11}Cl_{11}$), 40.9 (s, N-Me), 32.6 (s, $CH_2$, 2C), 30.4-29.6 (m, $CH_2$, 24C), 26.8 (s, $CH_2$, 2C), 24.4 (s, $CH_2$, 2C), 23.3 (s, $CH_2$, 2C), 14.4 (s, terminal $CH_3$, 2C). 11B NMR (128 MHz, $CD_3CN$): 6-2.25 (br, 1B, p-B), −9.72 (br, 5B, o/m-B), −12.79 (br, 5B, o/m-B).

Synthesis of $[(C_{18\text{-}22}H_{37\text{-}45})_2N(Me)H]^+$ $[HCB_{11}M_{11}]^-$ (Bis H Carb-Me)

To a 20 mL vial equipped with a magnetic stir bar was added $Cs[HCB_{11}Me_{11}]$. 2sulfolane (200 mg, 0.30 mmol) and 5 mL of a 4:1 PhF:$CH_3CN$ mixture, resulting in a clear, yellowish solution. To this solution was added $[(C_{18\text{-}22}H_{37\text{-}45})_2N(Me)H]]Cl$ (171 mg, 0.30 mmol) causing a white precipitate to form. The solution was allowed to stir for 2 hours and then was filtered through a plug of Celite. The filtrate was concentrated to a yellow oil which was brought up in ether and filtered through another plug of Celite. The solution was again concentrated to a yellow oil and was dried under reduced pressure. The oil was washed with water (8×, 2 mL portions), triturated with toluene (4×), and dried under reduced pressure at 50° C. to afford the title compound with 0.2 equiv. of sulfolane remaining. Yield: 153 mg, 0.178 mmol, 60% yield. $^1$H NMR (500 MHz, acetone-$d_6$): δ 3.45 (m, 4H, $CH_2$), 3.17 (s, 3H, CH3), 1.91 (m, 4H, $CH_2$), 1.49-1.20 (m, 60H, $CH_2$), 1.10 (br s, 1H, carb C—H), 0.88 (t, J=6.9 Hz, 6H, $CH_3$), 0.15 (s, 15H, B—$CH_3$), −0.38 (s, 15H, B—$CH_3$), −0.50 (s, 3H, B—$CH_3$). $^{13}C\{^1H\}$ NMR (126 MHz, acetone-$d_6$): δ 61.4 (br s, carborane-C), 57.3 (s, alpha-$CH_2$, 2C), 40.9 (s, NMe), 33.0 (s, $CH_2$, 2C), 32.0-28.8 (m, $CH_2$, 24C), 27.6 (s, gamma-$CH_2$, 2C), 25.0 (s, beta$CH_2$, 2C), 23.7 (s, $CH_2$, 2C), 14.8 (s, terminal $CH_3$, 2C), −0.27-−4.02 (br m, B—$CH_3$, 11C). $^{11}$B NMR (128 MHz, acetone-$d_6$): δ 0.48 (br, 1B, p-B), −7.70 (br, 5B, o/m-B), −11.11 (br, 5B, o/r-B).

Synthesis of $[Na]^+[H_2C{=}C(H)CH_2{-}CB_{11}Cl_{11}]^-$

To a 50 mL Schlenk flask was added $[Me_3NH]^+$ $[HCB_{11}Cl_{11}]^-$ (500 mg, 0.86 mmol), 2.5 equiv NaH (51.5 mg, 2.15 mmol) and THF (20 mL). The resulting suspension was stirred at room temperature for 2 h until it stopped bubbling. All volatiles were removed under vacuum, and then THF (20 mL) and allyl bromide (89 μL, 124.6 mg, 1.03 mmol) were added. The suspension was further stirred at room temperature overnight. NaCl was removed by filtering the solution through a short pad of Celite. $[Na]^+[H_2C{=}C(H)CH_2{-}CB_{11}C_{11}]^-$ was obtained as white solid after all volatiles were removed under vacuum. The residue was washed with cold pentane and dried under vacuum to afford the product. Yield: 427 mg, 0.73 mmol, 85% yield. $^1H$ NMR (500 MHz, $CD_3CN$): δ 6.10 (ddt, J=17.2, 9.9, 7.4 Hz, 1H), 5.13 (dq, J=16.7, 1.4 Hz, 1H), 5.08-5.01 (dq, J=16.7, 1.4 Hz, 1H), 3.01 (d, J=7.3 Hz, 3H). $^{11}B$ NMR (128 MHz, $CD_3CN$): δ −3.03, −10.10, −11.73. $^{13}C$ NMR (125 MHz, $CD_3CN$): δ 137.5 (s, $CHCH_2$), 116.5 (s, $CHCH_2$), 54.0 (brs, carborane-C), 29.4 (s. $CH_2CHCH_2$).

Synthesis of $[(C_8H_{17})_2N(Me)H]^+[H_2C{=}C(H)CH_2{-}CB_{11}Cl_{11}]^-$

In a 50 mL Schlenk flask, a solution of $[Na]^+[H_2C{=}C(H)CH_2{-}CB_{11}Cl_{11}]^-$ (300 mg, 0.513 mmol) in THF (10 mL) was added to a solution of $[(C_8H_{17})_2N(Me)H]^+[Cl]^-$ (165.3 mg, 0.564 mmol) in THF (10 mL). Upon mixing, precipitate formed immediately. The mixture was further stirred for 2 h, then filtered through a short pad of Celite. The filtrated was concentrated in vacuo, and the oil was purified by passing the toluene solution through a short pad of silica gel to remove excess aminium chloride salts. Concentration of the filtrate in vacuo afforded $[(C_8H_{17})_2N(Me)H]^+[H_2CC(H)CH_2CB_{11}C_{11}]^-$ as a viscous pale yellow oil. Yield: 360 mg, 0.44 mmol, 86% yield. $^1H$ NMR (500 MHz, $CDCl_3$): δ 6.16 (ddt, J=17.2, 9.9, 7.4 Hz, 1H), 5.20 (dq, J=16.7, 1.4 Hz, 1H), 5.12 (dq, J=16.7, 1.4 Hz, 1H), 3.01 (d, J=7.3 Hz, 3H), 3.15 (vt, J=7.5 Hz, 4H), 3.08 (d, J=7.4 Hz, 2H), 2.97 (s, 3H), 1.80 (p, J=8.0 Hz, 4H), 1.44-1.21 (m, 22H), 0.89 (t, J=7.0 Hz, 3H). $^{11}B$ NMR (128 MHz, $CDCl_3$): δ −3.53, −10.47, −11.75. $^3C$ NMR (125 MHz, $CD_3CN$): δ 137.6 (s, $CHCH_2$, 1C), 116.5 (s, $CHCH_2$, 1C), 57.1 (s, alpha-$CH_2$, 2C), 54.0 (brs, carborane-C, 1C), 40.8 (s, N-Me, 1C), 32.3 (s, $CH_2$, 2C), 29.6 (s, $CH_2$, 2C), 29.5 (s, $CH_2CHCH_2$, 1C), 26.9 (s, $CH_2$. 2C), 24.5 (s, $CH_2$, 2C), 23.3 (s, $CH_2$, 2C), 14.4 (s, terminal-Me, 2C).

Representative Ethylene/1-Octene Polymerization Procedure The ethylene octene copolymerizations were conducted in a 2 L Parr batch reactor. This reactor was designed for ethylene octene copolymerizations. The reactor was heated by an electrical heating mantle, and was cooled by an internal serpentine cooling coil containing cooling water. Both the reactor and the heating/cooling system were controlled and moni-tored by a Camile TG process computer. The bottom of the reactor was fitted with a dump valve, which empties the reactor contents into a SS dump pot, which was prefilled with a catalyst kill solution (typically 5 mL of an IRGAFOS 168/IRGANOX 1010/toluene mixture). The dump pot was vented to a 30 gal. blow-down tank, with both the pot and the tank $N_2$ purged. All chemicals used for polymerization or catalyst make-up were run through purification columns, to remove any impurities that may affect polymerization. The 1-octene, toluene and ISOPAR E were passed through 2 columns, the first containing A2 alumina, the second containing Q5 reactant. The ethylene was passed through 2 columns, the first containing A204 alumina and 4 A mole sieves, the second containing Q5 reactant. The $N_2$, used for transfers, was passed through a single column containing A204 alumina, 4 A mole sieves and Q5 reactant.

The reactor is loaded first from the shot tank that contains ISOPAR E and octene. The shot tank is filled to the load set-points by use of a lab scale which the tank is mounted on. After solvent addition, the reactor is heated up to the polymerization temperature setpoint. The ethylene is added to the reactor when at reaction temperature to maintain reaction pressure set-point. Ethylene addition amounts were monitored by a micro-motion flow meter. The catalyst and activator(s) were mixed with the appropriate amount of toluene to achieve a desired Molarity solution. The catalyst and activator(s) were handled in an inert glove box, drawn into a syringe and pressure transferred into the catalyst shot tank. This was followed by 3 rinses of toluene, 5 mL each. Before ethylene addition, 10 μmoles of MMAO was added to the reactor through the catalyst shot tank. Catalyst and activator was added when reactor pressure set-point was achieved.

Immediately after the catalyst addition, the time of reaction was monitored. Usually within the first two minutes of successful catalyst runs, an exotherm was observed, as well as decreasing reactor pressure. Ethylene was then added by the Camile to maintain reaction pressure set-point in the reactor. These polymerizations were run for 10 min., then the agitator was stopped, and the bottom dump valve opened to empty reactor contents into the dump pot. The dump pot contents were poured into trays placed in a lab hood, where the solvent was evaporated off overnight. The trays containing the remaining polymer were then transferred to a vacuum oven, where they were heated up to 140° C., under vacuum, to remove any remaining solvent. After the trays cooled to ambient temperature, the polymers were weighed for yield/efficiencies, and submitted for polymer testing. Results are shown in Tables 1-6.

Anilinium carborane, $[Me_2N(H)Ph][HCB_{11}H_{11}]$, used as a cocatalyst in the above polymerization, was compared to conventional cocatalysts, such as anilinium tetrakis(pentafluorophenyl)borate, $[Me_2N(H)Ph][B(C_6F_5)_4]$, and bis(hydrogenated-tallowalkyl)methylammonium tetrakis(pentafluorophenyl)borate $[(C_{18-22}H_{37-45})_2N(Me)H]$ $[B(C_6F_5)_4)]$. Four different catalyst systems were studied at 140° C. and two catalyst systems at 190° C. It was discovered that anilinium carborane (Carb) cocatalyst led to very active catalytic systems, with activities which were virtually the same as activators based on tetra-kis(pentafluorophenyl) borate. These results clearly demonstrate that carborane anions not only function well as weakly coordinating, but also are highly stable at elevated temperatures.

The present invention may be embodied in other forms without departing from the spirit and the essential attributes thereof, and, accordingly, reference should be made to the appended claims, rather than to the foregoing specification, as indicating the scope of the invention.

TABLE 1

| µmoles | Bis H borate µmoles | An Bor µmoles | Carb µmoles | Carb-H µmoles | Ethylene (g)added | Yield (g) | Efficiency (gPoly/gMetal) | Mw g/mol | Mw/Mn | Mole % Octene |
|---|---|---|---|---|---|---|---|---|---|---|
| 0.6 | 0.72 | — | — | — | 18.1 | 57.3 | 1,994,570 | 24,305 | 2.83 | 25.5 |
| 0.6 | — | 0.72 | — | — | 13.1 | 35.6 | 1,239,209 | 26,899 | 2.64 | 26.5 |
| 0.6 | — | — | 0.72 | — | 5.5 | 16.7 | 581,314 | 26,826 | 3.02 | 26.5 |
| Comp. Run | | | | | | | | | | |
| 2.2 | | | | 2.64 | 0 | 5.3 g | 50,315 | 26,940 | 4.67 | 24.3 |

Conditions: Temperature = 140° C., ISOPAR E = 605 g, Octene = 300 g, Ethylene Pressure = 288 psi

TABLE 2

| PCAT 2 µmoles | Bis H borate µmoles | An Bor µmoles | Carb µmoles | Ethylene (g) added | Yield (g) | Efficiency (gPoly/gMetal) | Mw g/mol | Mw/Mn | Mole % Octene |
|---|---|---|---|---|---|---|---|---|---|
| 0.5 | 0.6 | — | — | 16.4 | 28.1 | 1,173,768 | 266,376 | 2.20 | 9.2 |
| 0.5 | — | 0.6 | — | 18.2 | 29.0 | 1,211,362 | 258,629 | 2.31 | 9.0 |
| 0.5 | — | — | 0.6 | 21.5 | 34.3 | 1,432,749 | 239,628 | 2.50 | 9.8 |

Conditions: Temperature = 140° C., ISOPAR E = 605 g, Octene = 300 g, Ethylene Pressure = 288 psi

TABLE 3

| PCAT 2 µmoles | Bis H borate µmoles | An Bor µmoles | Carb µmoles | Ethylene (g) added | Yield (g) | Efficiency (gPoly/gMetal) | Mw g/mol | Mw/Mn | Mole % Octene |
|---|---|---|---|---|---|---|---|---|---|
| 0.6 | 0.72 | — | — | 8.6 | 11.2 | 389,864 | 106,756 | 2.16 | 8.1 |
| 0.6 | — | 0.72 | — | 6.9 | 10.6 | 368,978 | 98,484 | 2.02 | 8.1 |
| 0.6 | — | — | 0.72 | 6.8 | 9.5 | 330,688 | 94,286 | 2.08 | 7.9 |

Conditions: Temperature = 190° C., ISOPAR E = 520 g, Octene = 300 g, Ethylene Pressure = 400 psi

TABLE 4

| PCAT 3 µmoles | Bis H borate µmoles | An Bor µmoles | Carb µmoles | Ethylene (g) added | Yield (g) | Efficiency (gPoly/gMetal) | Mw g/mol | Mw/Mn | Mole % Octene |
|---|---|---|---|---|---|---|---|---|---|
| 1 | 1.2 | — | — | 25.1 | 88.0 | 964,658 | 32,593 | 3.0 | 29.0 |
| 1 | — | 1.2 | — | 28.1 | 101.3 | 1,110,453 | 27,101 | 3.1 | 31.7 |
| 1 | — | — | 1.2 | 21.3 | 80.0 | 876,962 | 18,289 | 3.5 | 28.0 |

Conditions: Temperature = 140° C., ISOPAR E = 605 g, Octene = 300 g, Ethylene Pressure = 288 psi

TABLE 5

| PCAT 4 µmoles | Bis H borate µmoles | An Bor µmoles | Carb µmoles | Ethylene (g) added | Yield (g) | Efficiency (gPoly/gMetal) | Mw g/mol | Mw/Mn | Mole % Octene |
|---|---|---|---|---|---|---|---|---|---|
| 0.08 | 0.096 | — | — | 8.4 | 69.3 | 4,855,314 | 409,322 | 2.3 | 32.0 |
| 0.08 | — | 0.096 | — | 13.1 | 82.6 | 5,784,638 | 410,324 | 2.4 | 31.9 |
| 0.08 | — | — | 0.096 | 12.6 | 60.6 | 4,243,935 | 424,293 | 2.4 | 30.6 |

Conditions: Temperature = 140° C., ISOPAR E = 605 g, Octene = 300 g, Ethylene Pressure = 288 psi

TABLE 6

| PCAT 4 µmoles | Bis H borate µmoles | An Bor µmoles | Carb µmoles | Ethylene (g) added | Yield (g) | Efficiency (gPoly/gMetal) | Mw | Mw/Mn | Mole % Octene |
|---|---|---|---|---|---|---|---|---|---|
| 0.3 | 0.36 | — | — | 34.3 | 60.0 | 1,120,511 | 191,997 | 2.2 | 22.3 |
| 0.3 | — | 0.36 | — | 28.6 | 55.0 | 1,027,135 | 187.300 | 2.3 | 22.6 |
| 0.3 | — | — | 0.36 | 21.8 | 45.4 | 847,853 | 198,225 | 2.2 | 23.9 |

Conditions: Temperature = 190° C., ISOPAR E = 520 g, Octene = 300 g, Ethylene Pressure = 400 psi

TABLE 7

| PCAT 1 µmoles | Bis H borate µmoles | Bis H Carb µmoles | Bis H Carb-Me µmoles | Ethylene (g) added | Yield (g) | Efficiency (gPoly/gMetal) | Mw g/mol | Mw/Mn | Mole % Octene |
|---|---|---|---|---|---|---|---|---|---|
| 0.6 | 0.72 | — | — | 33.3 | 96.7 | 3,366,054 | 21,342 | 2.9 | 24.1 |
| 0.6 | — | 0.72 | — | 32.7 | 91.4 | 3,181,565 | 21,231 | 3.1 | 23.1 |
| 0.6 | — | — | 0.72 | 0 | 0 | 0 | — | — | — |

Conditions: Temperature = 140° C., ISOPAR E = 605 g, Octene = 300 g, Ethylene Pressure = 288 psi, MMAO = 0 µmol

TABLE 8

| PCAT 2 µmoles | Bis H borate µmoles | Bis H Carb µmoles | Ethylene (g) added | Yield (g) | Efficiency (gPoly/gMetal) | Mw g/mol | Mw/Mn | Mole % Octene |
|---|---|---|---|---|---|---|---|---|
| 0.5 | 0.6 | — | 26.79 | 80.2 | 3,350,042 | 124,824 | 3.1 | 14.9 |
| 0.5 | — | 0.6 | 23.4 | 68 | 2,840,434 | 146,207 | 2.7 | 13.8 |

Conditions: Temperature = 140° C., ISOPAR E = 605 g, Octene = 300 g, Ethylene Pressure = 288 psi, MMAO = 0 µmol

TABLE 9

| PCAT 3 µmoles | Bis H borate µmoles | Bis H Carb µmoles | Ethylene (g) added | Yield (g) | Efficiency (gPoly/gMetal) | Mw g/mol | Mw/Mn | Mole % Octene |
|---|---|---|---|---|---|---|---|---|
| 1 | 1.2 | — | 20.4 | 64.1 | 702,666 | 26,137 | 3.4 | 26.7 |
| 1 | — | 1.2 | 16.16 | 51.7 | 566,737 | 22,713 | 3.8 | 26.2 |

Conditions: Temperature = 140° C., ISOPAR E = 605 g, Octene = 300 g, Ethylene Pressure = 288 psi, MMAO = 0 µmol

What is claimed is:

1. A catalyst system comprising the reaction product of at least the following:

A) a procatalyst, wherein the procatalyst is a compound represented by (Structure a)

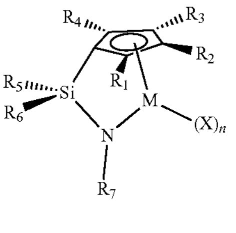

or

-continued (Structure c)

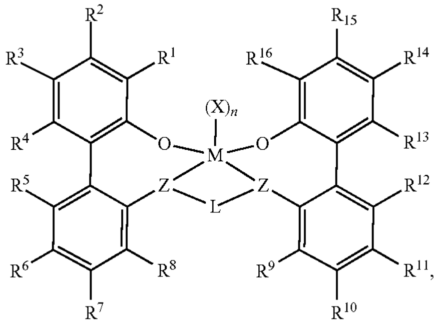

wherein for each of the Structures a and c, each M is independently, titanium, zirconium, or hafnium, each independently being in a formal oxidation state of +2, +3, or +4;

each n is an integer of from 0 to 3;

wherein when n is 0, X is absent;

each X independently is a monodentate ligand that is neutral, monoanionic, or dianionic; or two Xs are taken together to form a bidentate ligand that is neutral, monoanionic, or dianionic; and X and n are chosen in such a way that the compound represented by Structure a and Structure c is, overall, neutral; and wherein for Structure a, $R_1$ through $R_7$, and for Structure c, $R^1$ through $R^{16}$, are each, independently: a $(C_1\text{-}C_{40})$ hydrocarbyl, a $(C_1\text{-}C_{40})$ heterohydrocarbyl, a $Si(R^c)_3$, a $Ge(R^c)_3$, an $OR^c$, a $SR^c$, a $NO_2$, a CN, a $CF_3$, a $R^cS(O)$—, a $R^cS(O)_2$—, a $(R^c)_2C{=}N$—, a $R^cC(O)O$—, a $R^cOC(O)$—, a $R^cC(O)NR$—, a $(R^c)_2NC(O)$—, where each $R^c$ is independently a $(C_1\text{-}C_{30})$hydrocarbyl, a halogen atom, or a hydrogen atom, and wherein each of the hydrocarbyl, heterohydrocarbyl, and each $R^1$-$R^{16}$ group, independently, is unsubstituted or substituted with one or more $R^s$ substituents, each $R^s$ independently is selected from a halogen atom, a polyfluoro substitution, a perfluoro substitution, a $F_3C$—, a $FCH_2O$—, a $F_2HCO$—, a $F_3CO$—, a $R_3Si$—, a $R_3Ge$—, a RO—, a RS—, a RS(O)—, a $RS(O)_2$—, a $R_2P$—, a $R_2N$—, a $R_2C{=}N$—, a NC—, a RC(O)O—, a ROC(O)—, RC(O)NR—, or a $R_2NC(O)$—; and wherein for Structure a, two or more of $R_1$ through $R_7$, and for Structure c, two or more of $R^1$ through $R^{16}$ may combine together into one or more ring structures, with such ring structures having from 3 to 50 atoms in the ring excluding any hydrogen atoms; and wherein for Structure c, each Z independently is O, S, $N(C_1\text{-}C_{40})$hydrocarbyl, or $P(C_1\text{-}C_{40})$hydrocarbyl; and wherein for Structure c, L is $(C_1\text{-}C_{40})$hydrocarbylene or $(C_1\text{-}C_{40})$ heterohydrocarbylene, wherein the $(C_1\text{-}C_{40})$hydrocarbylene has a portion that comprises a 3-carbon atom to 10-carbon atom linker backbone linking the Z atoms in Structure c (to which L is bonded), and the $(C_1\text{-}C_{40})$heterohydrocarbylene has a portion that comprises a 3-atom to 10-atom linker backbone linking the Z atoms in formula (I), wherein each of the 3 to 10 atoms of the 3-atom to 10-atom linker backbone of the $(C_1\text{-}C_{40})$heterohydrocarbylene independently is a carbon atom or heteroatom, wherein each heteroatom independently is O, S, S(O), $S(O)_2$, $Si(R^c)_2$, $Ge(R^c)_2$, $P(R^c)$, or $N(R^c)$, wherein independently each $R^c$ is, independently, a $(C_1\text{-}C_{30})$hydrocarbyl; and B) at least one cocatalyst structure selected from the following i) through iii):

i) at least one cocatalyst comprising an anion having Structure 1 as shown below:

(Structure 1)

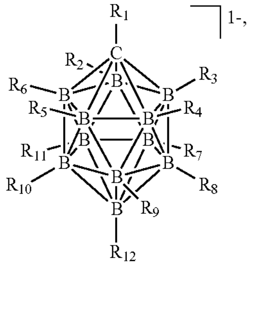

wherein $R_1$ through $R_{12}$ are each independently selected from the following: a halogen, a substituted or unsubstituted $(C_1\text{-}C_{40})$hydrocarbyl, a substituted or unsubstituted $(C_1\text{-}C_{40})$heterohydrocarbyl, $Si(R^c)_3$, $Si(N(R^c)_2)_3$, $Si(O(R^c)_2)_3$, $Ge(R^c)_3$, $Ge(N(R^c)_2)_3$, $Ge(O(R^c)_2)_3$, $P(R^c)_2$, $P(N(R^c)_2)_2$, $P(OR^c)_2$, $N(R^c)_2$, $NH(R^c)$, $NH_2$, OH, SH, $OR^c$, $SR^c$, $NO_2$, CN, $CF_3$, $CF_2R^c$, $CF(R^c)_2$, $R^cS(O)$—, $R^cS(O)_2$—, $(R^c)_2C{=}N$—, $R^cC(O)O$—, $R^cOC(O)$—, $R^cC(O)NR$—, $(R^c)_2NC(O)$—, or hydrogen, wherein each $R^c$ is independently a substituted or unsubstituted $(C_1\text{-}C_{35})$hydrocarbyl, or a substituted or unsubstituted $(C_1\text{-}C_{35})$heterohydrocarbyl; and wherein two or more of $R_1$ through $R_{12}$ may optionally form one or more ring structures; and wherein one or more hydrogen atoms may optionally be substituted with deuterium; and wherein, optionally, one of $R_1$ through $R_{12}$ may be selected from a $PH(R^c)_2$, $PH(N(R^c)_2)_2$, $PH(OR^c)$, $NH(R^c)_2$, $NH(R^c)_2$, $NH_3$, $OH_2$, $SH_2$, $OHR^c$, or $SHR^c$, to form a neutral structure; and wherein each $R^c$ is independently a substituted or unsubstituted $(C_1\text{-}C_{35})$ hydrocarbyl, or a substituted or unsubstituted $(C_1\text{-}C_{35})$ heterohydrocarbyl; and wherein at least one of $R_1$ through $R_{12}$ is a halogen; or ii) at least one cocatalyst comprising an anion having Structure 2 as shown below:

(Structure 2)

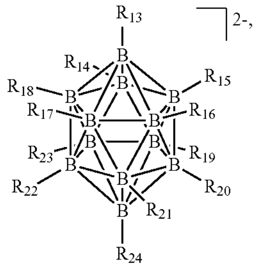

wherein $R_{13}$ through $R_{24}$ are each independently selected from the following: a halogen, a substituted or unsubstituted $(C_1\text{-}C_{40})$hydrocarbyl, a substituted or unsubstituted $(C_1\text{-}C_{40})$heterohydrocarbyl, $Si(R^c)_3$, $Si(N(R^c)_2)_3$, $Si(O(R^c)_2)_3$, $Ge(R^c)_3$, $Ge(N(R^c)_2)_3$, $Ge(O(R^c)_2)_3$, $P(R^c)_2$, $P(N(R^c)_2)_2$, $P(OR^c)_2$, $N(R^c)_2$, $NH(R^c)$, $NH_2$, OH, SH, $OR^c$, $SR^c$, $NO_2$, CN, $CF_3$, $CF_2R^c$, $CF(R^c)_2$, $R^cS(O)$—, $R^cS(O)_2$—, $(R^c)_2C{=}N$—, $R^cC(O)O$—, $R^cOC(O)$—, $R^cC(O)NR$—, $(R^c)_2NC(O)$—, or hydrogen, and wherein each $R^c$ is independently a substituted or unsubstituted $(C_1\text{-}C_{35})$hydrocarbyl, or a substituted or unsubstituted $(C_1\text{-}C_{35})$heterohydrocarbyl; and wherein two or more of $R_{13}$ through $R_{24}$ may optionally form one or more ring structures; and wherein one or more hydrogen atoms may optionally be substituted with deuterium; and wherein, optionally, one of $R_{13}$ through $R_{24}$ may be selected from a $PH(R^c)_2$, $PH(N(R^c)_2)_2$, $PH(OR^c)$, $NH(R^c)_2$, $NH(R^c)_2$, $NH_3$, $OH_2$, $SH_2$, $OHR^c$, or $SHR^c$, to form a neutral structure; and wherein each $R^c$ is independently a substituted or unsubstituted $(C_1\text{-}C_{35})$ hydrocarbyl, or a substituted or unsubstituted $(C_1\text{-}C_{35})$ heterohydrocarbyl; and wherein at least one of $R_{13}$ through $R_{24}$ is a halogen; or
iii) a combination of i and ii;
wherein the at least one cocatalyst comprises at least one structure selected from the following 1) through 95):
1)
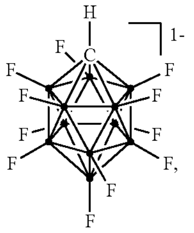
2)
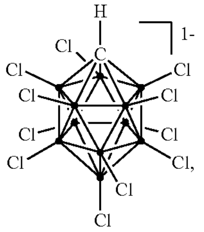
3)
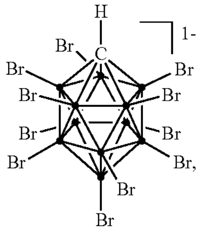
4)
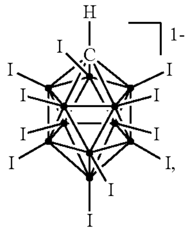
5)
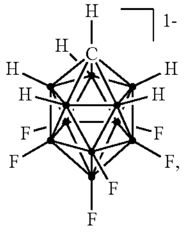
6)
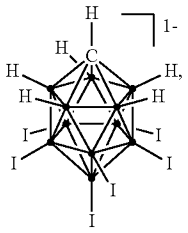
-continued
7)
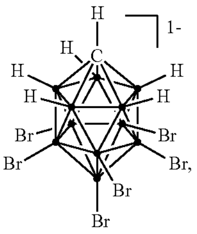
8)
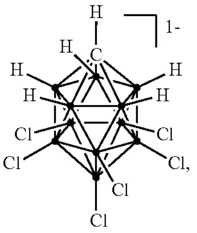
9)
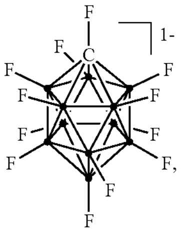
10)
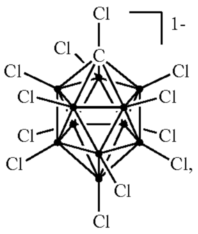
11)
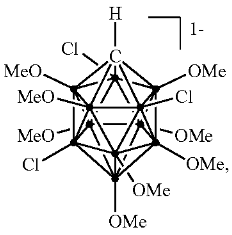
12)
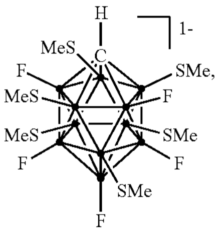

-continued
13)
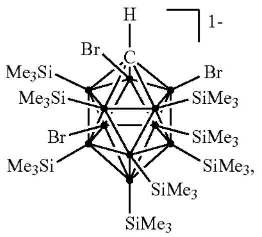
14)
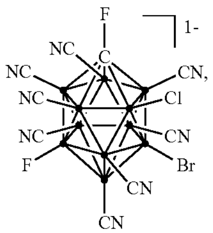
15)
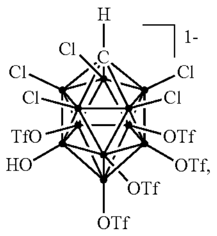
16)
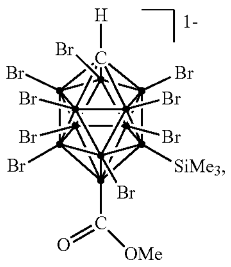
17)
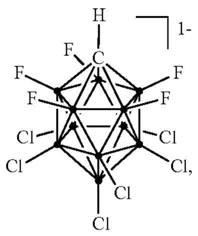
18)
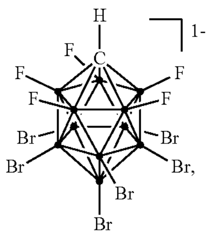
-continued
19)
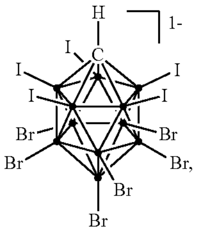
20)
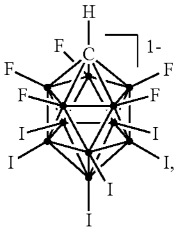
21)
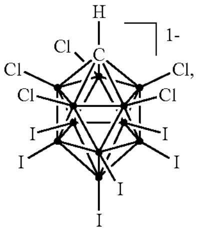
22)
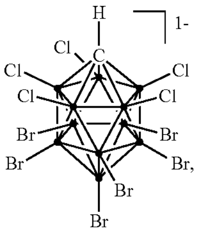
23)
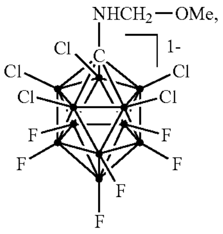
24)
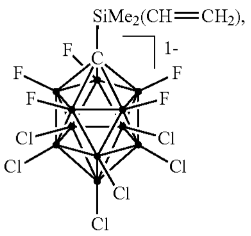

-continued
25)
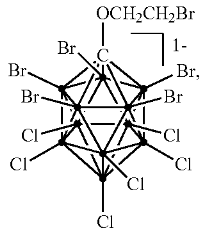
26)
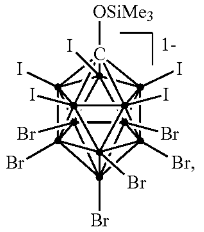
27)
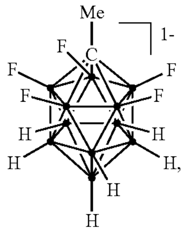
28)
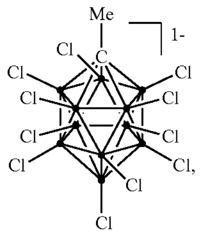
29)
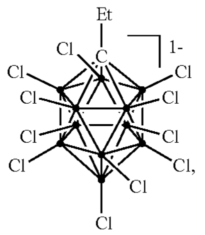
30)
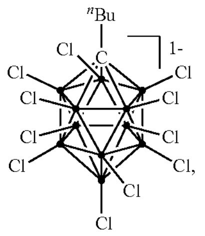
-continued
31)
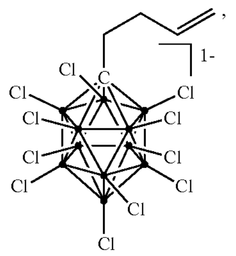
32)
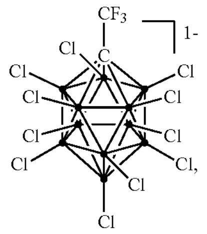
33)
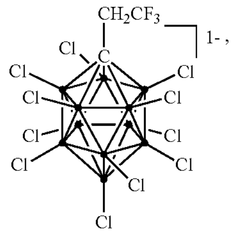
34)
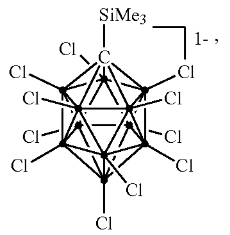
35)
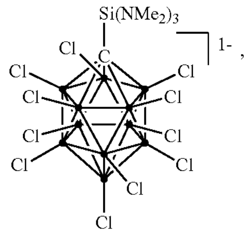
36)
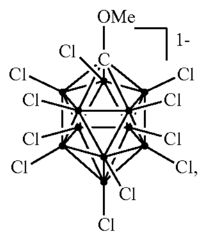

-continued
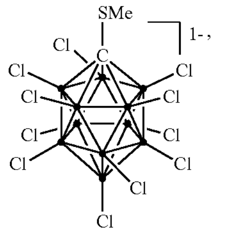
37)
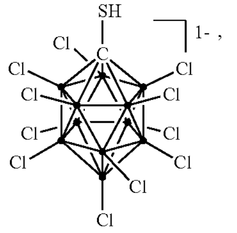
38)
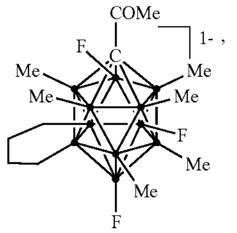
39)
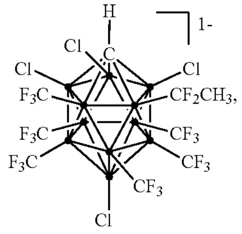
40)
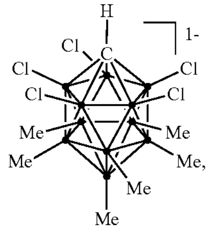
41)
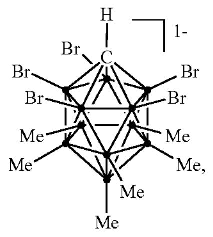
42)
-continued
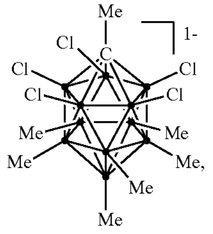
43)
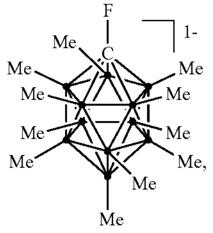
44)
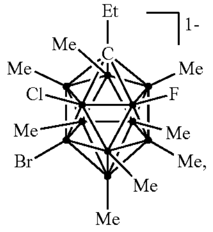
45)
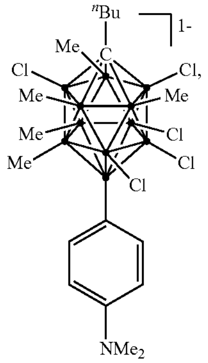
46)
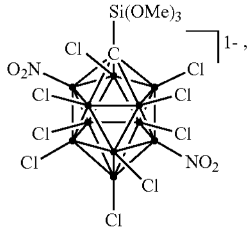
47)
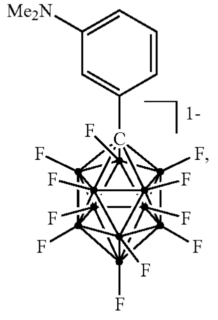
48)

-continued
49)
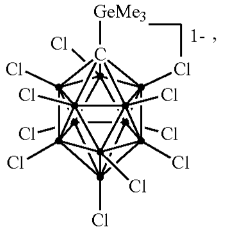
50)
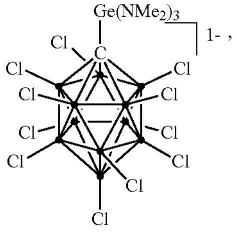
51)
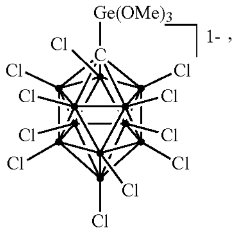
52)
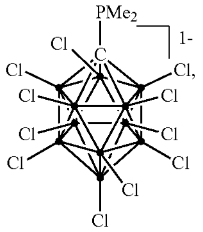
53)
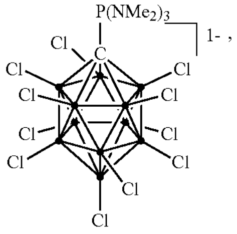
54)
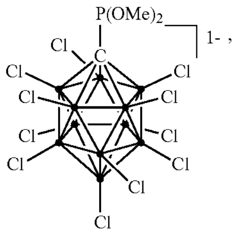
-continued
55)
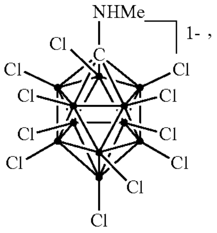
56)
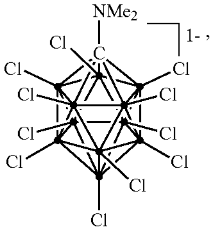
57)
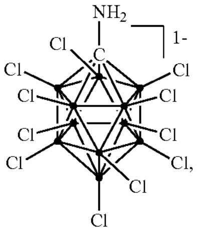
58)
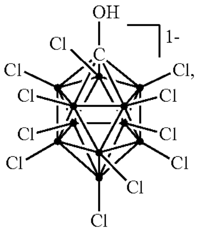
59)
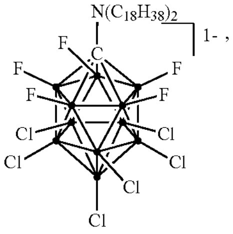
60)
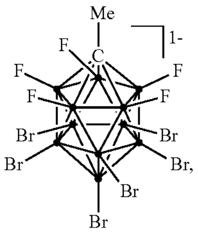

-continued
61)
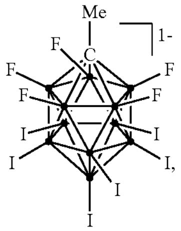
62)
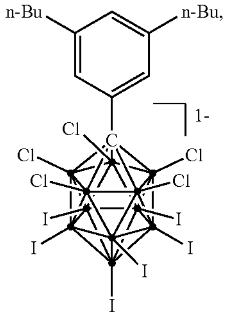
63)
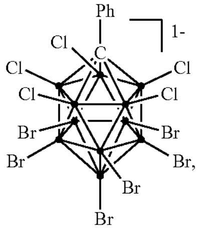
64)
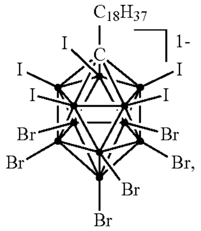
65)
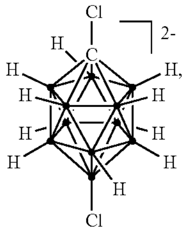
66)
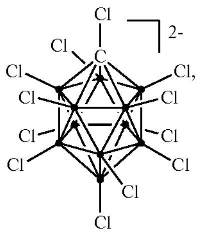
-continued
67)
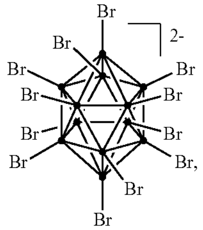
68)
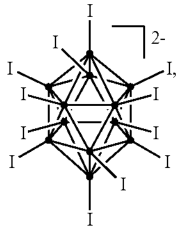
69)
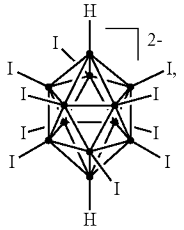
70)
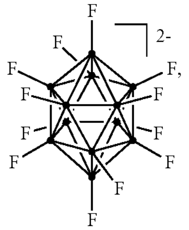
71)
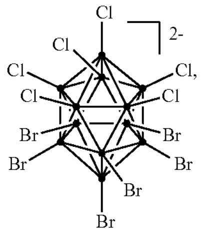
72)
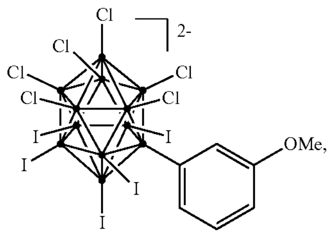

-continued
73)
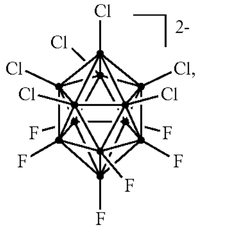
74)
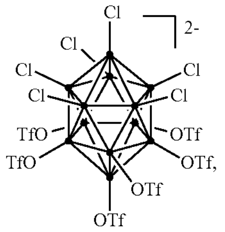
75)
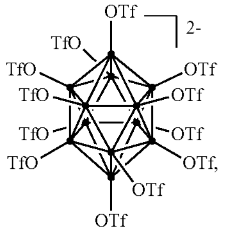
76)
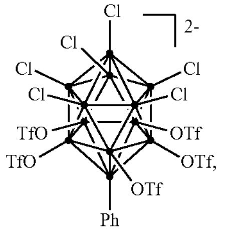
77)
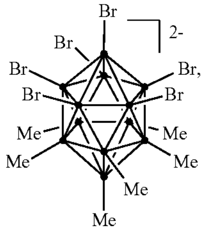
78)
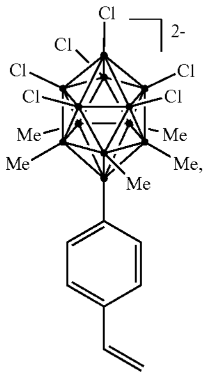
-continued
79)
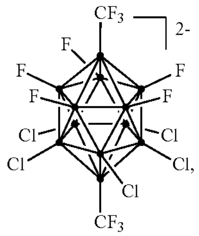
80)
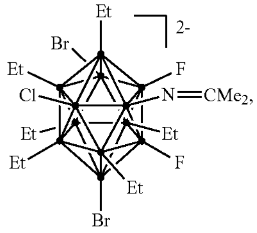
81)
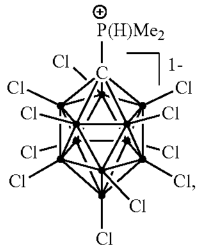
82)
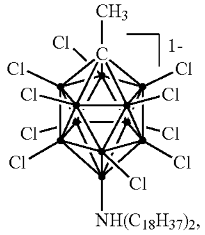
83)
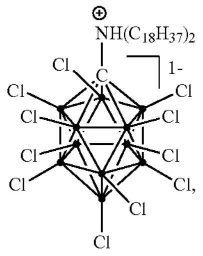
84)
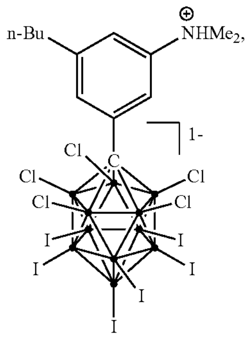

-continued

85)

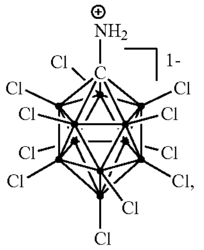

86)

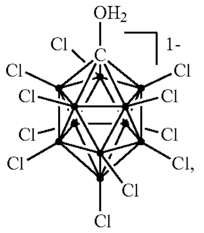

87)

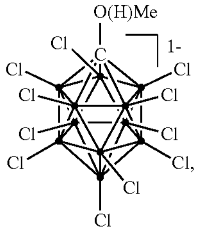

88)

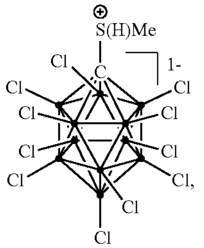

89)

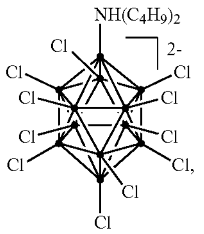

90)

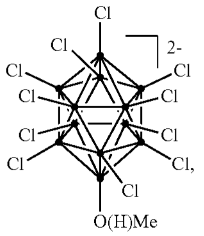

-continued

91)

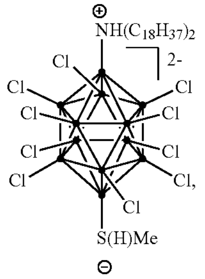

92)

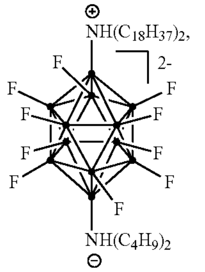

93)

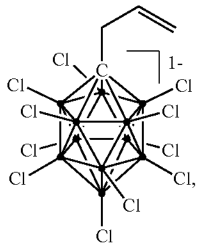

94)

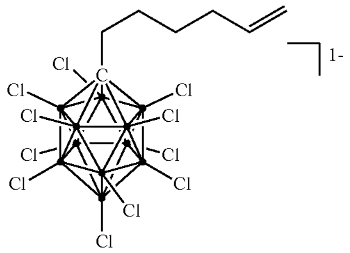

, or

95)

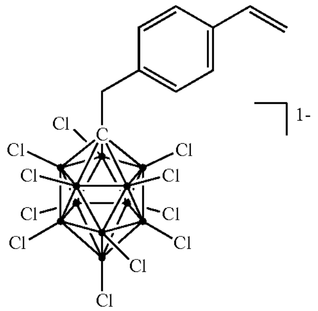

and the at least one cocatalyst structure further comprises at least one cation selected from the following: $[Y_nX\text{-}L_m]^+$, wherein X is selected from B, C, N, O, Al, Si, P, or S; each Y is independently selected from a $(C_1\text{-}C_{40})$-hydrocarbyl, $(C_1\text{-}C_{40})$heterohydrocarbyl, $Si(R^c)_3$, $Ge(R^c)_3$, $P(R^c)_2$, $N(R^c)_2$, $OR^c$, $SR^c$, $NO_2$, CN, $CF_3$, $R^cS(O)$—, $R^cS(O)_2$—, $(R^c)_2C{=}N$—, $R^cC(O)O$—, $R^cOC(O)$—, $R^cC(O)NR$—, $(R^c)_2NC(O)$—, halogen atom, or a hydrogen atom, wherein each of the hydrocarbyl, heterohydrocarbyl, $Si(R^c)_3$, $Ge(R^c)_3$, $P(R^c)_2$, $N(R^c)_2$, $OR^c$, $SR^c$, $R^cS(O)$—, $R^cS(O)_2$—, $(R^c)_2C{=}N$—, $R^cC(O)O$—, $R^cOC(O)$—, $R^cC(O)NR$—, $(R^c)_2NC(O)$—, is unsubstituted or substituted with one or more $R^s$ substituents, each $R^s$ independently is a halogen atom, polyfluoro substitution, perfluoro substitution, unsubstituted $(C_1\text{-}C_{18})$alkyl, $F_3C$—, $FCH_2O$—, $F_2HCO$—, $F_3CO$—, $R_3Si$—, $R_3Ge$—, RO—, RS—, RS(O)—, $RS(O)_2$—, $R_2P$—, $R_2N$—, $R_2C{=}N$—, NC—, RC(O)O—, ROC(O)—, RC(O)NR—, or $R_2NC(O)$—, or two of the Y groups together with X form a $(C_1\text{-}C_{18})$hydrocarbylene optionally substituted with one or more $R^s$ substituents, and wherein each $R^c$ is $(C_1\text{-}C_{40})$hydrocarbyl, and R independently is an unsubstituted $(C_1\text{-}C_{18})$hydrocarbyl; m is independently 0, 1, 2 or 3; L is a neutral Lewis base, and when m=0, L is not present; n is independently 2, 3, 4 or 5; and where two or three $[Y_nX]^+$ may optionally be linked together by joining two or more $(C_1\text{-}C_{40})$ hydrocarbyl, $(C_1\text{-}C_{40})$heterohydrocarbyl or an $R^c$.

2. The catalyst system of claim 1, wherein, for Structure 1 or Structure 2, the hydrocarbyl and/or the heterohydrocarbyl is/are each independently substituted with one or more substituents $R^s$; and each $R^s$ is independently a halogen atom, polyfluoro substitution, perfluoro substitution, $F_3C$—, $FCH_2O$—, $F_2HCO$—, $F_3CO$—, $R_3Si$—, $R_3Ge$—, RO—, RS—, RS(O)—, $RS(O)_2$—, $R_2P$—, $R_2N$—, $R_2C{=}N$—, NC—, RC(O)O—, ROC(O)—, RC(O)NR—, or $R_2NC(O)$—, wherein each R independently is an unsubstituted $(C_1\text{-}C_{18})$alkyl.

3. The catalyst system of claim 1, wherein, for Structure 1, each of $R_1$ through $R_{12}$ is unsubstituted; and/or wherein, for Structure 2, each of $R_{13}$ through $R_{24}$ is unsubstituted.

4. The catalyst system of claim 1, wherein, for Structure 1, two or more of $R_1$ through $R_{12}$ form one or more ring structures, wherein said ring structures have from 3 to 50 atoms in the ring excluding any hydrogen atoms; and/or wherein for Structure 2, two or more of $R_{13}$ through $R_{24}$ form one or more ring structures, wherein said ring structures have from 3 to 50 atoms in the ring, excluding any hydrogen atoms.

5. The catalyst system of claim 1, wherein, for Structure 1, none of $R_1$ through $R_{12}$ forms ring structures; and/or wherein for Structure 2, none of $R_{13}$ through $R_{24}$ forms ring structures.

6. The catalyst system of claim 1, wherein, the anion of the at least one cocatalyst comprises at least three halogen atoms.

7. The catalyst system of claim 1, wherein the at least one cocatalyst structure comprises at least one anion having Structure 1 and/or at least one anion having Structure 2, and the at least one cocatalyst structure further comprises at least one cation having a structure represented by formula (I), formula (II), or formula (III)

$^+N(H)R^N_3$ (I)

where each RN is independently $(C_1\text{-}C_{30})$alkyl or $(C_6\text{-}C_{24})$aryl;

(II)

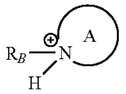

wherein $R_B$ is $(C_1\text{-}C_{40})$-hydrocarbyl, ring A is a 5-7 membered heterocycloalkyl ring having 1 or 2 hetero atoms selected from oxygen, nitrogen, and sulfur, and the heterocycloalkyl ring is optionally substituted with 1 or more halogen atoms, unsubstituted $(C_1\text{-}C_{18})$alkyl, halo$(C_1\text{-}C_6)$alkoxy, $R_3Si$—, $R_3Ge$—, RO—, RS—, RS(O)—, $RS(O)_2$—, $R_2P$—, $R_2N$—, $R_2C{=}N$—, NC—, RC(O)O—, ROC(O)—, RC(O)NR—, or $R_2NC(O)$— wherein each R is independently unsubstituted $(C_1\text{-}C_{18})$hydrocarbyl;

(III)

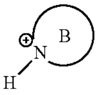

wherein ring B is a 5-7 membered heteroaryl group having 1 or 2 hetero atoms selected from oxygen, nitrogen, and sulfur, and the heteroaryl group is optionally substituted with 1 or more halogen atoms, unsubstituted $(C_1\text{-}C_{18})$alkyl, halo$(C_1\text{-}C_6)$alkoxy, $R_3Si$—, $R_3Ge$—, RO—, RS—, RS(O)—, $RS(O)_2$—, $R_2P$—, $R_2N$—, $R_2C{=}N$—, NC—, RC(O)O—, ROC(O)—, RC(O)NR—, or $R_2NC(O)$— wherein each R is independently unsubstituted $(C_1\text{-}C_{18})$hydrocarbyl.

8. The catalyst system of claim 1, wherein the at least one cocatalyst structure further comprises a cation and the cation is $^+N(H)R^N_3$, where at least two $R^N$ are chosen from $(C_{10}\text{-}C_{20})$alkyl.

9. The catalyst system of claim 1, wherein the at least one cocatalyst structure further comprises at least one cation and the at least one cation is $^+C(C_6H_5)_3$.

10. The catalyst system of claim 1, wherein the at least one cation is $^+C(C_6H_4R^c)_3$, where $R^c$ is $(C_1\text{-}C_{20})$alkyl.

11. The catalyst system of claim 1, wherein the at least one cation is $[Al(R^N)_2(OR^N_2)_n]^+$, where each $R^N$ is chosen from $(C_1\text{-}C_{30})$alkyl or $(C_6\text{-}C_{24})$aryl and n is 1 or 2, or two $R^N$ together with the Al atom to which they are attached form a cyclic structure.

12. The catalyst system of claim 1, wherein the at least one cation is $[Fe(Cp(R^N)_n)_2]^+$, wherein n is independently 1, 2, 3, 4 or 5 and each $R^N$ is chosen from $(C_1\text{-}C_{30})$alkyl or $(C_6\text{-}C_{24})$aryl, or two or more $R^N$ together with the group to which they are attached form a cyclic structure.

13. The catalyst system of claim 1, wherein the at least one cocatalyst structure further comprises at least one cation selected from the group consisting of:

(a)

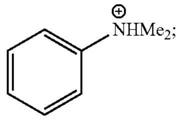

(b)

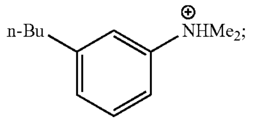

(c)

$\oplus$ $N(H)(CH_3)(C_{18}H_{37})_2$;

(d)

$\oplus$ $O(H)Me_2$;

-continued (e)

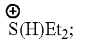

(f)

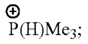

(g)

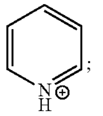

(h)

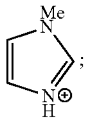

(i)

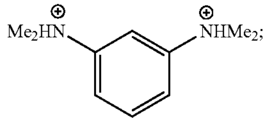

(j)

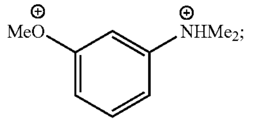

(k)

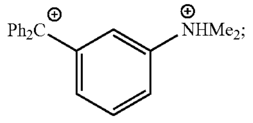

(l)

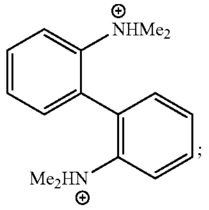

(m)

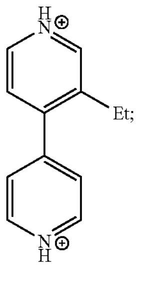

(n)

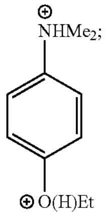

(o)

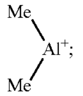

-continued (p)

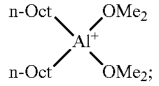

(q)

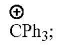

(r)

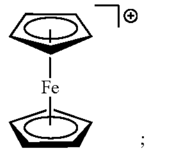

(s)

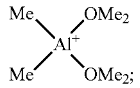

(t)

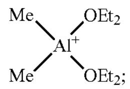

and (u)

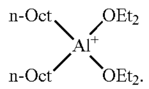

14. The catalyst system of claim 1, wherein the procatalyst is (tert-butylamido)(1,1-dimethyl-2,3,4,9-hexahydronaphthal-enyl) dimethylsilanetitaniumdimethyl; (tert-butylamido)(1,1,2,3-tetramethyl-2,3,4,9,10-η-1,4,5,6,7,8-hexahydronaphthalenyl) dimethylsilanetitaniumdimethyl; (tert-butylamido)-(tetramethyl-$\eta^5$-cyclopentadienyl) dimethylsilanetitanium dibenzyl; (tert-butylamido)-(tetramethyl-$\eta^5$-cyclopentadienyl) dimethylsilanetitanium dimethyl; (tert-butylamido)(tetramethyl-$\eta^5$-cyclopentadienyl)-1,2-ethanediyltitanium dimethyl; (tert-butylamido)(tetramethyl-$\eta^5$-cyclopentadienyl) dimethylsilane titanium $(III)_2$-(dimethylamino)benzyl; (tert-butylamido)(tetramethyl-$\eta^5$-cyclo-pentadienyl) dimethylsilanetitanium (III) 2,4-dimethyl-pentadienyl; (tert-butylamido)-(tetramethyl-$\eta^5$-cyclopentadienyl) dimethylsilanetitanium (II) 1,4-diphenyl-1,3-butadiene; (tert-butylamido)(tetramethyl-$\eta^5$-cyclopentadienyl) dimethylsilanetitanium (II) 1,3-pentadiene; (tert-butylamido)(2-methylindenyl) dimethyl-silanetitanium (II) 1,4-diphenyl-1,3-butadiene; (tertbutylamido)(2 methylindenyl)-dimethylsilanetitanium (II) 2,4-hexadiene; or (tertbutylamido)(2-methylindenyl) dimethylsilanetitanium (IV) 2,3-dimethyl-1,3-butadiene.

15. The catalyst system of claim 1, wherein the procatalyst is

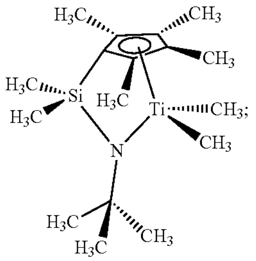

-continued

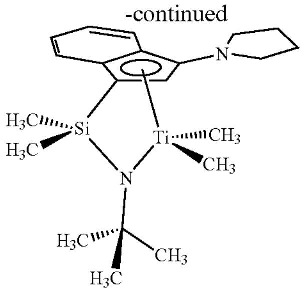

; or

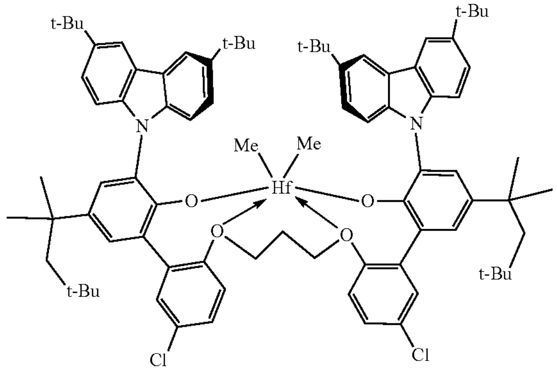

.

16. The catalyst system of claim 1, wherein the procatalyst is bis((2-oxyl-3-(1,2,3,4,6,7,8,9-octahydroanthracen-5-yl)-5-(methyl)phenyl)-2-phenoxy)propane-1,2-diylzirconium (IV) dimethyl; bis((2-oxyl-3-(1,2,3,4,6,7,8,9-octahydroanthracen-5-yl)-5-(methyl)phenyl)-2-phenoxy)propane-1,2-diylzirconium (IV) dichloride; bis((2-oxyl-1-3-(dibenzo-1H-pyrrole-1-yl)-5-(methyl)phenyl)-2-phenoxy)propane-1,2-diylzirconium (IV) dimethyl; bis((2-oxyl-1-3-(dibenzo-1H-pyrrole-1-yl)-5-(methyl)-phenyl)-2-phenoxy)propane-1,2-diylzirconium(IV) dichloride; bis((2-oxyl-3-(1,1-dimethylethyl)phen-1-yl)-5-(methyl)phenyl)-2-phenoxy)propane-1,2-diylzirconium (IV) dimethyl; bis((2-oxyl-3-(1,1-dimethylethyl)phen-1-yl)-5-(methyl)phenyl)-2-phenoxy)-propane-1,2-diylzirconium (IV) dichloride; bis((2-oxyl-3-(1,2,3,4,6,7,8,9-octahydroanthracen-5-yl)-5-(methyl)phenyl)-2-phenoxy)-trans-cyclohexane-1,2-dimethylenyl-1,2-diylzirconium (IV) dimethyl; bis((2-oxyl-3-(1,2,3,4,6,7,8,9-octahydroanthracen-5-yl)-5-(methyl)phenyl)-2-phenoxy)-trans-cyclohexane-1,2-dimethylenyl-1,2-diylzirconium (IV) dichloride; bis((2-oxyl-3-(dibenzo-1H-pyrrole-1-yl)-5-(methyl)phenyl)-2-phenoxy)-trans-cyclohexane-1,2-dimethylenyl-1,2-diylzirconium (IV) dimethyl; bis((2-oxyl-3-(dibenzo-1H-pyrrole-1-yl)-5-(methyl)phenyl)-2-phenoxy)-transcyclohexane-1,2-dimethylenyl-1,2-diylzirconium (IV) dichloride; bis((2-oxyl-3-(1,1-dimethylethyl)phen-yl)-5-(methyl)phenyl)-2-phenoxy)-trans-cyclohexane-1,2-dimethylenyl-1,2-diylzirconium (IV) dimethyl; bis((2-oxyl-3-(1,1-dimethylethyl)phen-1-yl)-5-(methyl)phenyl)-2-phenoxy)-trans-cyclohexane-1,2-dimethylenyl-1,2-diylzirconium (IV) dichloride; bis((2-oxyl-3-(1,2,3,4,6,7,8,9-octahydroanthracen-5-yl)-5-(methyl)phenyl)-2-phenoxy)-cis-cyclohexane-1,3-diylzirconium (IV) dimethyl; bis((2-oxyl-3-(1,2,3,4,6,7,8,9-octahydroanthracen-5-yl)-5-(methyl)phenyl)-2-phenoxy)-ciscyclohexane-1,3-diylzirconium (IV) dichloride; bis((2-oxyl-3-(dibenzo-1H-pyrrole-1-yl)-5-(methyl)phenyl)-2-phenoxy)-cis-cyclohexane-1,3-diylzirconium (IV) dimethyl; or bis((2-oxyl-3-(dibenzo-H-pyrrole-1-yl)-5-(methyl)phenyl)-2-phenoxy)-cis-cyclohexane-1,3-diylzirconium (IV) dichloride.

17. A process for producing a polymer composition, said process comprising:

selecting ethylene or propylene; and polymerizing said ethylene or propylene, with one or more α-olefin copolymers and/or one or more dienes, in the presence of the catalyst system of claim 1.

18. A catalyst system comprising the reaction product of at least the following:

A) a procatalyst, wherein the procatalyst is a compound represented by (Structure a)

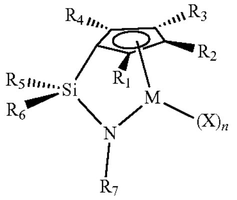

or (Structure c)

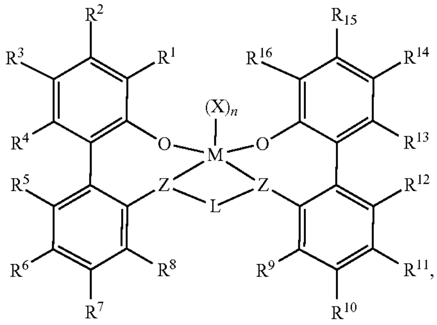

wherein for each of the Structures a and c, each M is independently, titanium, zirconium, or hafnium, each independently being in a formal oxidation state of +2, +3, or +4;

each n is an integer of from 0 to 3;

wherein when n is 0, X is absent;

each X independently is a monodentate ligand that is neutral, monoanionic, or dianionic; or two Xs are taken together to form a bidentate ligand that is neutral, monoanionic, or dianionic; and X and n are chosen in such a way that the compound represented by Structure a and Structure c is, overall, neutral; and wherein for Structure a, $R_1$ through $R_7$, and for Structure c, $R^1$ through $R^{16}$, are each, independently: a $(C_1\text{-}C_{40})$ hydrocarbyl, a $(C_1\text{-}C_{40})$ heterohydrocarbyl, a $Si(R^c)_3$, a $Ge(R^c)_3$, an $OR^c$, a $SR^c$, a $NO_2$, a CN, a $CF_3$, a $R^cS(O)$—, a $R^cS(O)_2$—, a $(R^c)_2C{=}N$—, a $R^cC(O)O$—, a $R^cOC(O)$—, a $R^cC(O)NR$—, a $(R^c)_2NC(O)$—, where each $R^c$ is independently a $(C_1\text{-}C_{30})$hydrocarbyl, a halogen atom, or a hydrogen atom, and wherein each of the hydrocarbyl, heterohydrocarbyl, and each $R^1$-$R^{16}$ group, independently, is unsubstituted or substituted with one or more $R^s$ substituents, each $R^s$ independently is selected from a halogen atom, a polyfluoro substitution, a perfluoro substitution, a $F_3C$—, a $FCH_2O$—, a $F_2HCO$—, a $F_3CO$—, a $R_3Si$—, a $R_3Ge$—, a RO—, a RS—, a RS(O)—, a $RS(O)_2$—, a $R_2P$—, a $R_2N$—, a $R_2C{=}N$—, a NC—, a RC(O)O—, a ROC(O)—, RC(O)NR—, or a $R_2NC(O)$—; and wherein for Structure a, two or more of $R_1$ through $R_7$, and for Structure c, two or more of $R^1$ through $R^{16}$ may combine together into one or more ring structures, with such ring structures having from 3 to 50 atoms in the ring excluding any hydrogen atoms; and wherein for Structure c, each Z independently is O, S, $N(C_1\text{-}C_{40})$hydrocarbyl, or $P(C_1\text{-}C_{40})$hydrocarbyl; and wherein for Structure c, L is $(C_1\text{-}C_{40})$hydrocarbylene or $(C_1\text{-}C_{40})$ heterohydrocarbylene, wherein the $(C_1\text{-}C_{40})$hydrocarbylene has a portion that comprises a 3-carbon atom to 10-carbon atom linker backbone linking the Z atoms in Structure c (to which L is bonded), and the $(C_1\text{-}C_{40})$heterohydrocarbylene has a portion that comprises a 3-atom to 10-atom linker backbone linking the Z atoms in formula (I), wherein each of the 3 to 10 atoms of the 3-atom to 10-atom linker backbone of the $(C_1\text{-}C_{40})$heterohydrocarbylene independently is a carbon atom or heteroatom, wherein each heteroatom independently is O, S, S(O), $S(O)_2$, $Si(R^c)_2$, $Ge(R^c)_2$, $P(R^c)$, or $N(R^c)$, wherein independently each $R^c$ is, independently, a $(C_1\text{-}C_{30})$hydrocarbyl, or is absent, provided that for $Si(R^c)_2$, $Ge(R^c)_2$, $P(R^c)$, or $N(R^c)$, $R^c$ is not absent; and B) at least one cocatalyst structure selected from the following i) through iii):

i) at least one cocatalyst comprising an anion having Structure 1 as shown below:

(Structure 1)

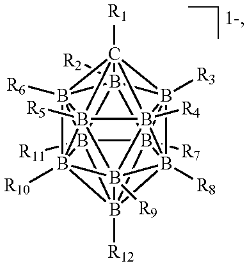

wherein $R_1$ through $R_{12}$ are each independently selected from the following: a halogen, a substituted or unsubstituted $(C_0\text{-}C_{40})$hydrocarbyl, a substituted or unsubstituted $(C_1\text{-}C_{40})$heterohydrocarbyl, $Si(R^c)_3$, $Si(N(R^c)_2)_3$, $Si(O(R^c)_2)_3$, $Ge(R^c)_3$, $Ge(N(R^c)_2)_3$, $Ge(O(R^c)_2)_3$, $P(R^c)_2$, $P(N(R^c)_2)_2$, $P(OR^c)_2$, $N(R^c)_2$, $NH(R^c)$, $NH_2$, OH, SH, $OR^c$, $SR^c$, $NO_2$, CN, $CF_3$, $CF_2R^c$, $CF(R^c)_2$, $R^cS(O)$—, $R^cS(O)_2$—, $(R^c)_2C{=}N$—, $R^cC(O)O$—, $R^cOC(O)$—, $R^cC(O)NR$—, $(R^c)_2NC(O)$—, or hydrogen, wherein each $R^c$ is independently a substituted or unsubstituted $(C_1\text{-}C_{35})$hydrocarbyl, or a substituted or unsubstituted $(C_1\text{-}C_{35})$heterohydrocarbyl; and wherein two or more of $R_1$ through $R_{12}$ may optionally form one or more ring structures; and wherein one or more hydrogen atoms may optionally be substituted with deuterium; and wherein, optionally, one of $R_1$ through $R_{12}$ may be selected from a $PH(R^c)_2$, $PH(N(R^c)_2)_2$, $PH(OR^c)$, $NH(R^c)_2$, $NH(R^c)_2$, $NH_3$, $OH_2$, $SH_2$, $OHR^c$, or $SHR^c$, to form a neutral structure; and wherein each $R^c$ is independently a substituted or unsubstituted $(C_1\text{-}C_{35})$ hydrocarbyl, or a substituted or unsubstituted $(C_1\text{-}C_{35})$ heterohydrocarbyl; and wherein at least one of $R_1$ through $R_{12}$ is a halogen; or ii) at least one cocatalyst comprising an anion having Structure 2 as shown below:

(Structure 2)

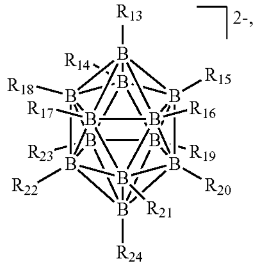

wherein $R_{13}$ through $R_{24}$ are each independently selected from the following: a halogen, a substituted or unsubstituted $(C_1\text{-}C_{40})$hydrocarbyl, a substituted or unsubstituted $(C_1\text{-}C_{40})$heterohydrocarbyl, $Si(R^c)_3$, $Si(N(R^c)_2)_3$, $Si(O(R^c)_2)_3$, $Ge(R^c)_3$, $Ge(N(R^c)_2)_3$, $Ge(O(R^c)_2)_3$, $P(R^c)_2$, $P(N(R^c)_2)_2$, $P(OR^c)_2$, $N(R^c)_2$, $NH(R^c)$, $NH_2$, OH, SH, $OR^c$, $SR^c$, $NO_2$, CN, $CF_3$, $CF_2R^c$, $CF(R^c)_2$, $R^cS(O)$—, $R^cS(O)_2$—, $(R^c)_2C{=}N$—, $R^cC(O)O$—, $R^cOC(O)$—, $R^cC(O)NR$—, $(R^c)_2NC(O)$—, or hydrogen, and wherein each $R^c$ is independently a substituted or unsubstituted $(C_1\text{-}C_{35})$hydrocarbyl, or a substituted or unsubstituted $(C_1\text{-}C_{35})$heterohydrocarbyl; and wherein two or more of $R_{13}$ through $R_{24}$ may optionally form one or more ring structures; and wherein one or more hydrogen atoms may optionally be substituted with deuterium; and wherein, optionally, one of $R_{13}$ through $R_{24}$ may be selected from a $PH(R^c)_2$, $PH(N(R^c)_2)_2$, $PH(OR^c)$, $NH(R^c)_2$, $NH(R^c)_2$, $NH_3$, $OH_2$, $SH_2$, $OHR^c$, or $SHR^c$, to form a neutral structure; and wherein each $R^c$ is independently a substituted or unsubstituted $(C_1\text{-}C_{35})$ hydrocarbyl, or a substituted or unsubstituted $(C_1\text{-}C_{35})$ heterohydrocarbyl; and wherein at least one of $R_{13}$ through $R_{24}$ is a halogen; or iii) a combination of i and ii; and the at least one cocatalyst structure further comprises at least one cation selected from the following: $[Y_nX\text{-}L_m]^+$, wherein X is selected from B, C, N, O, Al, Si, P, or S; each Y is independently selected from a $(C_1\text{-}C_{40})$-hydrocarbyl, $(C_1\text{-}C_{40})$heterohydrocarbyl, $Si(R^c)_3$, $Ge(R^c)_3$, $P(R^c)_2$, $N(R^c)_2$, $OR^c$, $SR^c$, $NO_2$, CN, $CF_3$, $R^cS(O)$—, $R^cS(O)_2$—, $(R^c)_2C{=}N$—, $R^cC(O)O$—, $R^cOC(O)$—, $R^cC(O)NR$—, $(R^c)_2NC(O)$—, halogen atom, or a hydrogen atom, wherein each of the hydrocarbyl, heterohydrocarbyl, $Si(R^c)_3$, $Ge(R^c)_3$, $P(R^c)_2$, $N(R^c)_2$, $OR^c$, $SR^c$, $R^cS(O)$—, $R^cS(O)_2$—, $(R^c)_2C{=}N$—, $R^cC(O)O$—, $R^cOC(O)$—, $R^cC(O)NR$—, $(R^c)_2NC(O)$—, is unsubstituted or substituted with one or more $R^s$ substituents, each $R^s$ independently is a halogen atom, polyfluoro substitution, perfluoro substitution, unsubstituted $(C_1\text{-}C_{18})$alkyl, $F_3C$—, $FCH_2O$—, $F_2HCO$—, $F_3CO$—, $R_3Si$—, $R_3Ge$—, RO—, RS—, RS(O)—, $RS(O)_2$—, $R_2P$—, $R_2N$—, $R_2C{=}N$—, NC—, RC(O)O—, ROC(O)—, RC(O)NR—, or $R_2NC(O)$—, or two of the Y groups together with X form a $(C_1\text{-}C_{18})$hydrocarbylene optionally substituted with one or more $R^s$ substituents, and wherein each $R^c$ is $(C_1\text{-}C_{40})$hydrocarbyl, and R independently is an unsubstituted $(C_1\text{-}C_{18})$hydrocarbyl; m is independently 0, 1, 2 or 3; L is a neutral Lewis base, and when m=0, L is not present; n is independently 2, 3, 4 or 5; and where two or three $[Y_nX]^+$ may optionally be linked together by joining two or more $(C_1\text{-}C_{40})$hydrocarbyl, $(C_1\text{-}C_{40})$heterohydrocarbyl or an $R^c$, and wherein the at least one cocatalyst structure comprises at least one anion having Structure 1 and/or at least one anion having Structure 2, and the at least one cocatalyst structure further comprises at least one cation selected from the group consisting of formula (I), formula (II), and formula (III)

$^+N(H)R^N_3$ (I)

where each $R^N$ is independently selected from $(C_1\text{-}C_{30})$ alkyl and $(C_6\text{-}C_{24})$aryl;

(II)

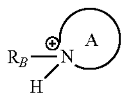

wherein $R_B$ is $(C_1\text{-}C_{40})$-hydrocarbyl, ring A is a 5-7 membered heterocycloalkyl ring having 1 or 2 hetero atoms selected from oxygen, nitrogen, and sulfur, and the heterocycloalkyl ring is optionally substituted with 1 or more halogen atoms, unsubstituted $(C_1\text{-}C_{18})$alkyl, halo$(C_1\text{-}C_6)$alkoxy, $R_3Si$—, $R_3Ge$—, RO—, RS—, RS(O)—, $RS(O)_2$—, $R_2P$—, $R_2N$—, $R_2C{=}N$—, NC—, RC(O)O—, ROC(O)—, RC(O)NR—, or $R_2NC$(O)— wherein each R is independently unsubstituted $(C_1\text{-}C_{18})$hydrocarbyl;

(III)

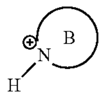

wherein ring B is a 5-7 membered heteroaryl group having 1 or 2 hetero atoms selected from oxygen, nitrogen, and sulfur, and the heteroaryl group is optionally substituted with 1 or more halogen atoms, unsubstituted $(C_1\text{-}C_{18})$alkyl, halo$(C_1\text{-}C_6)$alkoxy, $R_3Si$—, $R_3Ge$—, RO—, RS—, RS(O)—, $RS(O)_2$—, $R_2P$—, $R_2N$—, $R_2C{=}N$—, NC—, RC(O)O—, ROC(O)—, RC(O)NR—, or $R_2NC$(O)— wherein each R is independently unsubstituted $(C_1\text{-}C_{18})$ hydrocarbyl-.

19. A catalyst system comprising the reaction product of at least the following:

A) a procatalyst, wherein the procatalyst is selected from

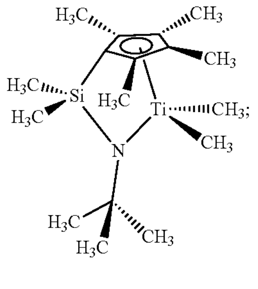

-continued

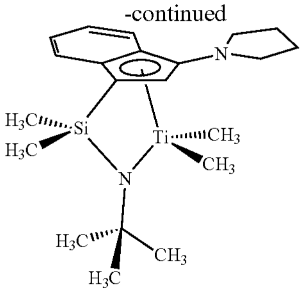

; or

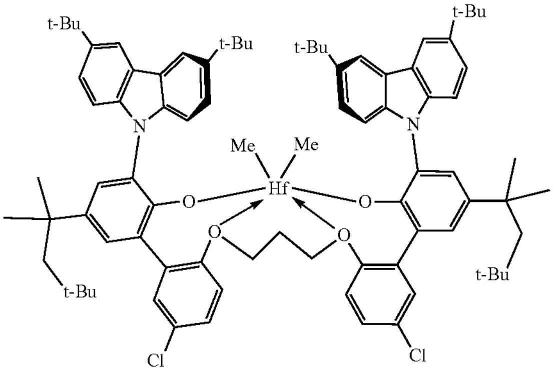

;

and

B) at least one cocatalyst structure selected from the following i) through iii):

i) at least one cocatalyst comprising an anion having Structure 1 as shown below:

(Structure 1)

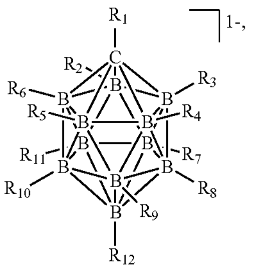

wherein $R_1$ through $R_{12}$ are each independently selected from the following: a halogen, a substituted or unsubstituted $(C_1\text{-}C_{40})$hydrocarbyl, a substituted or unsubstituted $(C_1\text{-}C_{40})$heterohydrocarbyl, $Si(R^c)_3$, $Si(N(R^c)_2)_3$, $Si(O(R^c)_2)_3$, $Ge(R^c)_3$, $Ge(N(R^c)_2)_3$, $Ge(O(R^c)_2)_3$, $P(R^c)_2$, $P(N(R^c)_2)_2$, $P(OR^c)_2$, $N(R^c)_2$, $NH(R^c)$, $NH_2$, OH, SH, $OR^c$, $SR^c$, $NO_2$, CN, $CF_3$, $CF_2R^c$, $CF(R^c)_2$, $R^cS(O)$—, $R^cS(O)_2$—, $(R^c)_2C{=}N$—, $R^cC(O)O$—, $R^cOC(O)$—, $R^cC(O)NR$—, $(R^c)_2NC(O)$—, or hydrogen, wherein each $R^c$ is independently a substituted or unsubstituted $(C_1\text{-}C_{35})$hydrocarbyl, or a substituted or unsubstituted $(C_1\text{-}C_{35})$heterohydrocarbyl; and wherein two or more of $R_1$ through $R_{12}$ may optionally form one or more ring structures; and wherein one or more hydrogen atoms may optionally be substituted with deuterium; and wherein, optionally, one of $R_1$ through $R_{12}$ may be selected from a $PH(R^c)_2$, $PH(N(R^c)_2)_2$, $PH(OR^c)$, $NH(R^c)_2$, $NH(R^c)_2$, $NH_3$, $OH_2$, $SH_2$, $OHR^c$, or $SHR^c$, to form a neutral structure; and wherein each $R^c$ is independently a substituted or unsubstituted ($C_1$-$C_{35}$) hydrocarbyl, or a substituted or unsubstituted ($C_1$-$C_{35}$) heterohydrocarbyl; and wherein at least one of $R_1$ through $R_{12}$ is a halogen; or ii) at least one cocatalyst comprising an anion having Structure 2 as shown below:

(Structure 2)

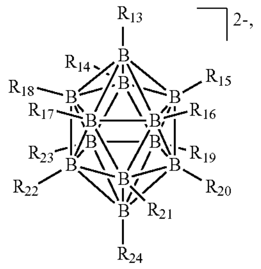

wherein $R_{13}$ through $R_{24}$ are each independently selected from the following: a halogen, a substituted or unsubstituted ($C_1$-$C_{40}$)hydrocarbyl, a substituted or unsubstituted ($C_1$-$C_{40}$)heterohydrocarbyl, $Si(R^c)_3$, $Si(N(R^c)_2)_3$, $Si(O(R^c)_2)_3$, $Ge(R^c)_3$, $Ge(N(R^c)_2)_3$, $Ge(O(R^c)_2)_3$, $P(R^c)_2$, $P(N(R^c)_2)_2$, $P(OR^c)_2$, $N(R^c)_2$, $NH(R^c)$, $NH_2$, OH, SH, $OR^c$, $SR^c$, $NO_2$, CN, $CF_3$, $CF_2R^c$, $CF(R^c)_2$, $R^cS(O)$—, $R^cS(O)_2$—, $(R^c)_2C{=}N$—, $R^cC(O)O$—, $R^cOC(O)$—, $R^cC(O)NR$—, $(R^c)_2NC(O)$—, or hydrogen, and wherein each $R^c$ is independently a substituted or unsubstituted ($C_1$-$C_{35}$)hydrocarbyl, or a substituted or unsubstituted ($C_1$-$C_{35}$)heterohydrocarbyl; and wherein two or more of $R_{13}$ through $R_{24}$ may optionally form one or more ring structures; and wherein one or more hydrogen atoms may optionally be substituted with deuterium; and wherein, optionally, one of $R_{13}$ through $R_{24}$ may be selected from a $PH(R^c)_2$, $PH(N(R^c)_2)_2$, $PH(OR^c)$, $NH(R^c)_2$, $NH(R^c)_2$, $NH_3$, $OH_2$, $SH_2$, $OHR^c$, or $SHR^c$, to form a neutral structure; and wherein each $R^c$ is independently a substituted or unsubstituted ($C_1$-$C_{35}$) hydrocarbyl, or a substituted or unsubstituted ($C_1$-$C_{35}$) heterohydrocarbyl; and wherein at least one of $R_{13}$ through $R_{24}$ is a halogen; or iii) a combination of i and ii; and the at least one cocatalyst structure further comprises at least one cation selected from the following: $[Y_nX\text{-}L_m]^+$, wherein X is selected from B, C, N, O, Al, Si, P, or S; each Y is independently selected from a ($C_1$-$C_{40}$)-hydrocarbyl, ($C_1$-$C_{40}$)heterohydrocarbyl, $Si(R^c)_3$, $Ge(R^c)_3$, $P(R^c)_2$, $N(R^c)_2$, $OR^c$, $SR^c$, $NO_2$, CN, $CF_3$, $R^cS(O)$—, $R^cS(O)_2$—, $(R^c)_2C{=}N$—, $R^cC(O)O$—, $R^cOC(O)$—, $R^cC(O)NR$—, $(R^c)_2NC(O)$—, halogen atom, or a hydrogen atom, wherein each of the hydrocarbyl, heterohydrocarbyl, $Si(R^c)_3$, $Ge(R^c)_3$, $P(R^c)_2$, $N(R^c)_2$, $OR^c$, $SR^c$, $R^cS(O)$—, $R^cS(O)_2$—, $(R^c)_2C{=}N$—, $R^cC(O)O$—, $R^cOC(O)$—, $R^cC(O)NR$—, $(R^c)_2NC(O)$—, is unsubstituted or substituted with one or more $R^s$ substituents, each $R^s$ independently is a halogen atom, polyfluoro substitution, perfluoro substitution, unsubstituted ($C_1$-$C_{18}$)alkyl, $F_3C$—, $FCH_2O$—, $F_2HCO$—, $F_3CO$—, $R_3Si$—, $R_3Ge$—, RO—, RS—, RS(O)—, $RS(O)_2$—, $R_2P$—, $R_2N$—, $R_2C{=}N$—, NC—, RC(O)O—, ROC(O)—, RC(O)NR—, or $R_2NC(O)$—, or two of the Y groups together with X form a ($C_1$-$C_{18}$)hydrocarbylene optionally substituted with one or more $R^s$ substituents, and wherein each $R^c$ is ($C_1$-$C_{40}$)hydrocarbyl, and R independently is an unsubstituted ($C_1$-$C_{18}$)hydrocarbyl; m is independently 0, 1, 2 or 3; L is a neutral Lewis base, and when m=0, L is not present; n is independently 2, 3, 4 or 5; and where two or three $[Y_nX]^+$ may optionally be linked together by joining two or more ($C_1$-$C_{40}$)hydrocarbyl, ($C_1$-$C_{40}$)heterohydrocarbyl or an $R^c$.

* * * * *